(12) United States Patent
Schleicher et al.

(10) Patent No.: US 9,767,926 B2
(45) Date of Patent: Sep. 19, 2017

(54) MODULAR NUCLEAR FISSION WASTE CONVERSION REACTOR

(75) Inventors: Robert W. Schleicher, Carlsbad, CA (US); Hangbok Choi, San Diego, CA (US); Alan M. Baxter, San Diego, CA (US)

(73) Assignee: General Atomics, San Diego, CA (US)

( * ) Notice: Subject to any disclaimer, the term of this patent is extended or adjusted under 35 U.S.C. 154(b) by 1219 days.

(21) Appl. No.: 13/566,078

(22) Filed: Aug. 3, 2012

(65) Prior Publication Data

US 2017/0243662 A1   Aug. 24, 2017

Related U.S. Application Data

(63) Continuation of application No. PCT/US2011/023765, filed on Feb. 4, 2011.

(60) Provisional application No. 61/301,554, filed on Feb. 4, 2010, provisional application No. 61/305,799, filed on Feb. 18, 2010.

(51) Int. Cl.
    *G21C 3/07* (2006.01)

(52) U.S. Cl.
    CPC ...................... *G21C 3/07* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 3,664,923 A | * | 5/1972 | Connolly | G21C 1/024 376/175 |
| 3,907,948 A | * | 9/1975 | Gyarmati | G21C 3/044 264/0.5 |
| 4,636,352 A | | 1/1987 | Boyle | |
| 4,749,544 A | | 6/1988 | Crowther et al. | |

(Continued)

FOREIGN PATENT DOCUMENTS

| CN | 1134197 A | 10/1996 |
|---|---|---|
| CN | 101589439 A | 11/2009 |

(Continued)

OTHER PUBLICATIONS

Crane et al., "Development of Uranium Carbide as a Nuclear Fuel." UNC-5084 Jan. 15, 1963.*

(Continued)

*Primary Examiner* — Sean P Burke
(74) *Attorney, Agent, or Firm* — Fitch, Even, Tabin & Flannery LLP

(57) ABSTRACT

A modular, nuclear waste conversion reactor that continuously produces usable energy while converting U-238 and/or other fertile waste materials to fissionable nuclides. The reactor has a highly uniform, self-controlled, core (2) with a decades-long life and does not require reactivity control mechanisms within the boundary of the active core during operation to retain adequate safety. The exemplary embodiment employs high-temperature helium coolant, a dual-segment (22) initial annular critical core, carbide fuel, a fission product gas collection system, ceramic cladding and structural internals to create a modular reactor design that economically produces energy over multiple generations of reactor cores with only minimum addition of fertile material from one generation to the next.

19 Claims, 14 Drawing Sheets

(56) References Cited

U.S. PATENT DOCUMENTS

| | | | |
|---|---|---|---|
| 5,493,592 | A | 2/1996 | Garzarolli et al. |
| 5,513,226 | A | 4/1996 | Baxter et al. |
| 6,472,677 | B1 | 10/2002 | Rodriguez et al. |
| 6,738,446 | B2 | 5/2004 | Venneri et al. |
| 7,666,463 | B1 * | 2/2010 | Youchison ............... G21C 3/58 427/226 |
| 2003/0156675 | A1 | 8/2003 | Venneri et al. |
| 2006/0039524 | A1 | 2/2006 | Feinroth |
| 2006/0056572 | A1 | 3/2006 | Lecomte |
| 2006/0210011 | A1 * | 9/2006 | Karam ................... G21C 1/022 376/347 |
| 2008/0123795 | A1 | 5/2008 | Hyde et al. |
| 2008/0123796 | A1 | 5/2008 | Hyde et al. |
| 2008/0123797 | A1 | 5/2008 | Hyde et al. |
| 2008/0232535 | A1 | 9/2008 | Ahlfeld et al. |
| 2008/0240333 | A1 | 10/2008 | Ahlfeld et al. |
| 2009/0080587 | A1 | 3/2009 | Ahlfeld et al. |
| 2009/0080588 | A1 | 3/2009 | Ahlfeld et al. |
| 2009/0252283 | A1 | 10/2009 | Ahlfeld |
| 2009/0274262 | A1 | 11/2009 | Ravenet |
| 2010/0266084 | A1 * | 10/2010 | Ahlfeld ................. G21C 1/026 376/207 |

FOREIGN PATENT DOCUMENTS

| | | |
|---|---|---|
| JP | 4885100 | 10/1973 |
| JP | 5132798 | 9/1976 |
| JP | 63140991 | 6/1988 |
| JP | 02206794 | 8/1990 |
| JP | 08129093 | 5/1996 |
| JP | 2008501977 | 1/2008 |
| JP | 2009505047 | 2/2009 |
| WO | 2006076039 | 7/2006 |
| WO | 2007017503 | 2/2007 |
| WO | 2008105860 | 9/2008 |
| WO | 2009126270 | 10/2009 |

OTHER PUBLICATIONS

PCT; Written Opinion of the International Searching authority issued in International Application No. PCT/US2011/023765; Mailed May 24, 2011; 7 Pages.

Teller et al.; "Completely Automated Nuclear Reactors for Long-Term Operation"; Prepared for submittal to the Fronteirs in Physics Symposium, Lubbock, Texas Oct. 1995; 15 Pages.

M.P. Labar et al.; "The Gas Turbine-Modular Helium Reactor"; Nuclear News; Oct. 2003; 10 Pages.

Preliminary Notice of Reasons for Rejection for Japanese Patent Application No. 2012-552113 mailed from the Japan Patent Office on Dec. 2, 2014.

First Office Action for Chinese Patent Application No. 201180008332.9 mailed from the State Intellectual Property Office of People's Republic of China on Sep. 19, 2014.

"Research on Manufacturing Carbide Fuel for Fast Fission Reactors No. 1—Conditioning of Carbide Uranium and Sintering of Pellets"; Power Reactor and Nuclear Fuel Development Corporation, Tokai Plant, Nov. 1970.

Decision for Final Rejection for Japanese Patent Application No. 2012-552113 mailed by the Japanese Patent Office on Aug. 18, 2015.

Choi et al; "A Feasibility Study of a Long-Life Gas-Cooled Fast Reactor Fuel Cycle"; Proceedings of HTR 2010; Prague, Czech Republic; Oct. 18, 2010; 7 pages.

Choi et al; "A Preliminary Physics Study of a Long-Life Modular Gas-Cooled Fast Reactor"; Advances in Small- and Medium-Sized Reactor Designs; General Atomics; Jun. 13, 2010; pp. 575-576.

Choi et al; "Design Characteristics of the Energy Multiplier Module (EM2)"; Advances in Small and Medium Sized Reactor Designs; Transactions of the American Nuclear Society, vol. 104, Hollywood, Florida; Jun. 26, 2011; pp. 929-930.

Choi et al; "Energy Multiplier Module (EM2) Recycling Fuel Cycles"; SMR R&D-III: Innovative Concepts; Transactions of the American Nuclear Society, vol. 105, Washington, D.C.; Oct. 30, 2011; pp. 1115-1116.

Choi et al; "Feasibility of Recycling a Long-Life Gas-Cooled Fast Reactor"; Proceedings of GLOBAL 2011; Makuhari, Japan; Dec. 11, 2011; 5 pages.

Choi et al; "Fission Product Effects of a High-Burnup Small Gas-cooled Fast Reactor"; Physics Issues for Small, Compact Reactors; Transactions of the American Nuclear Society, vol. 107, San Diego, California; Nov. 11, 2012; pp. 1253-1255.

Choi et al; "Progress on Privately Funded Energy Multiplier Module (EM2) Program"; SMR: Progression and Status; Transactions of the American Nuclear Society, vol. 106; Chicago, Illinois; Jun. 24, 2012; pp. 604-605.

Choi et al; "A Feasibility Study of Thorium Utilization in Energy Multiplier Module (EM2)"; Progress in Reactor Physics Analysis for Thorium-Fueled Reactors; General Atomics; Nov. 7, 2010; pp. 813-814.

Schleicher et al; "Configuring EM2 to Meet the Challenges of Economics, Waste Disposition and Non-Proliferation Confronting Nuclear Energy in the U.S."; Invited paper at ICENES, San Fransico; General Atomics; May 23, 2011; 6 pages.

Schleicher et al; "Design and Development of EM2"; Proceedings of the ASME 2014 Small Modular Reactors Symposium; Washington, D.C.; Apr. 15, 2014; 8 pages.

Schleicher et al; "EM2: An Innvoative Approach to U.S. Energy Security and Nuclear Waste Disposition"; Nuclear Power Intl. 2010 Conference; 2010; 11 pages.

Schleicher et al; "Improved Utilization of U.S. Nuclear Energy Resources Without Reprocessing"; Advanced Waste Management and Fuel Cycle Topics; Nov. 15, 2009; one page.

First Rejection for United Arab Emirates Patent Application No. 0818/2012 mailed from the United Arab Emirates Ministry of Economy on Apr. 28, 2016.

\* cited by examiner

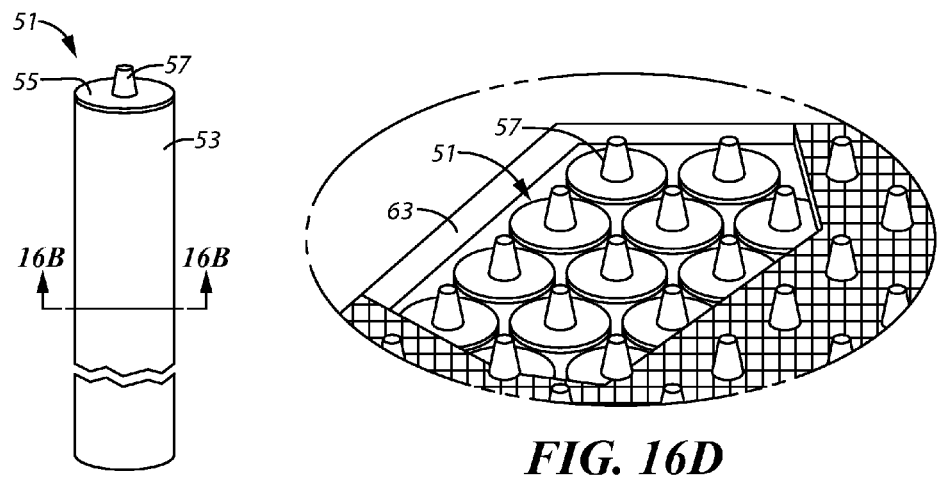
FIG. 16A
FIG. 16D
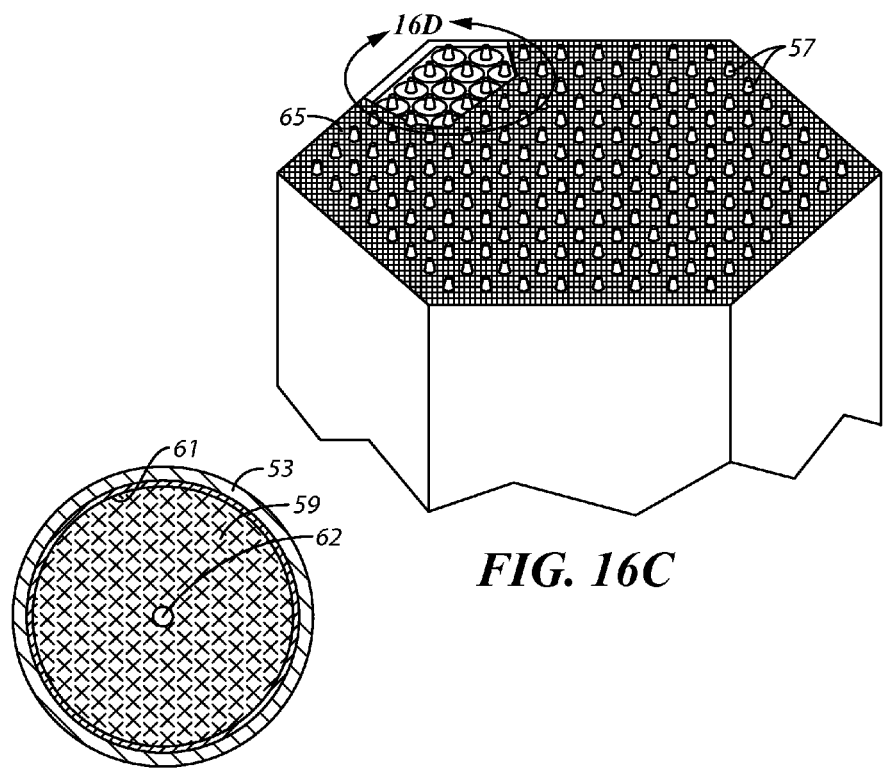
FIG. 16C
FIG. 16B

MODULAR NUCLEAR FISSION WASTE CONVERSION REACTOR

RELATED APPLICATIONS

This application is a continuation of International Application No. PCT/US2011/023765, filed Feb. 4, 2011, which claims priority from U.S. Provisional Application No. 61/301,554, filed Feb. 4, 2010 and U.S. Provisional Application No. 61/305,799, filed Feb. 18, 2010, the disclosures of all of which applications are incorporated herein by reference.

FIELD OF THE INVENTION

The present application relates to nuclear reactors and methods for operation thereof, and more particularly to nuclear reactors which can operate for extended periods of time without refueling.

BACKGROUND OF THE INVENTION

The concept of an automated nuclear reactor for long-term operation was the subject of a January 1996 article by Edward Teller and others which focused on the concept of breeding without reprocessing using a nuclear burn wave which traveled from an initial fissile region, where there was enriched fissile material that was inherently critical, into fertile material which shifted the primary fission reaction from one location to another within the overall reactor core. This concept was further developed by some of the authors on this 1996 paper and others resulting in the publication of descriptions of such traveling wave reactors in a series of published U.S. applications, including Application Nos. 2008/0123796; 2008/0232525; and 2009/0080587.

The present invention approaches this objective in a different manner to provide modular nuclear fission waste conversion reactors which can operate without refueling for several decades, producing power continuously over their lifetime and resulting in an ultimate core of spent fuel material containing as much or more fissile material, suitable for reuse, than was present in the initial core.

SUMMARY OF THE INVENTION

Exemplary embodiments disclosed hereinafter provide modular nuclear waste conversion reactors and methods for their operation. These exemplary embodiments include, without limitation, high-temperature helium coolant, alignment of a dual-segment annular section core, carbide fuel for providing energy over multiple generations of reactor cores, fission product gas collection system, ceramic cladding and schematic structural internal arrangements.

In one particular aspect, the invention provides a nuclear fission reactor designed to operate for a decade or longer without refueling, which reactor comprises: a reactor vessel, a central core within said vessel for creating heat via fission reactions in said core, which core includes one or more initial fissile sections and flanking conversion sections, said one or more initial fissile sections remaining an active, integral part of a critical core region throughout the lifetime of the central core, a helium circulation system for extracting heat from said core by the circulation of helium into and out of said vessel to maintain the core temperature between about 700° C. and 1000° C. and to generate power from said heated helium exterior of said vessel, said one or more initial fissile sections of said core comprising fuel elements in the form of silicon carbide containers which contain sintered fuel bodies comprising carbide fissile and fertile nuclides, and a system for withdrawing volatile fission products from said fuel elements during normal operation.

In another particular aspect, the invention provides a nuclear fission waste conversion reactor designed to operate for a decade or longer without refueling, which reactor comprises: a reactor vessel, a central core within said vessel for creating heat via fission reactions in said core, which core includes one or more initial fissile sections and flanking conversion sections, which one or more initial fissile sections remain a part of the critical central core throughout reactor lifetime, a helium circulation system for extracting heat from said core by the circulation of helium into and out of said vessel to maintain the core temperature between about 700° C. and 1000° C. and to generate power from said heated helium at a location exterior of said vessel, said core including a plurality of fuel elements in the form of silicon carbide containers that enclose sintered bodies of carbide fissile and/or fertile nuclides, and a system for withdrawing volatile fission products from said plurality of fuel elements during normal operation.

In a further particular aspect, the invention provides a nuclear fission reactor designed to operate for a decade or longer without refueling, which reactor comprises: (1) a reactor vessel, (2) a central core within said vessel for creating heat via fission reactions therein, which core contains (a) two initial fissile sections located in two vertically spaced apart horizontal regions, with each horizontal region comprising a generally annular area of sintered bodies of carbide fissile fuel and (b) a plurality of conversion sections that comprise horizontal regions containing sintered bodies of fertile fuel which conversion section horizontal regions are located above, between and below said two horizontal regions containing said two initial fissile sections, said two initial fissile sections remaining an active, integral part of a critical core region throughout the lifetime of the central core, (3) a helium circulation system for extracting heat from said core by the circulation of helium into and out of said vessel to maintain the core temperature between about 700° C. and 1000° C. and to generate power from said heated helium exterior of said vessel, and (4) a system for withdrawing volatile fission products from said sintered bodies of fuel during normal operation.

In still another particular aspect, the invention provides generations of reactors wherein the first generation reactor core has a fissile fuel section which comprises low enriched uranium (LEU) and/or a down-blend of weapons-grade plutonium (WPu) or the like, and wherein subsequent generation reactor cores comprise the heavy metal discharge of a previous generation reactor from which some fission products have been separated.

In a still further aspect, the invention provides a reactor having a core comprising an initial fissile region plus a fertile region that comprises spent nuclear fuel (SNF), depleted uranium (DU) and/or natural uranium, which reactor operates with fuel utilization and fuel burnup values that more than double those of conventional light water reactors (LWRs).

In a yet further aspect, the invention provides a small reactor which can be transported to a site which reactor is designed to maintain a flat reactivity, close to unity, without control poisons for over 20 years without refueling or shuffling of fuel elements, and which is capable of utilizing a wide variety of nuclear fuels and waste, such as discharged, but unreprocessed, fuel from LWRs from which the claddings have been removed.

In yet another aspect, the invention provides a small reactor which can be factory-assembled and which uses a small, enriched uranium critical region in the central core to convert DU to plutonium and thereby expand the critical core region outward throughout the central core into now-converted fertile regions while maintaining a flat reactivity, close to unity, without control poisons, for about 15 to 30 years without refueling or fuel shuffling.

BRIEF DESCRIPTION OF THE DRAWINGS

Illustrative embodiments are illustrated in referenced figures of the drawings; however, it is intended that the embodiments and figures disclosed herein are to be considered illustrative rather than restrictive.

FIG. 8D is a perspective view of a section of a neutron shield that might immediately surround the outer reflector assembly, which shield may be formed of arcuate plates of $B_4C$ or the like.

FIG. 16A is a perspective view of an alternative embodiment of a fuel element to that shown in FIG. 5, which might be employed in a modular nuclear fission waste conversion reactor embodying features of the present invention.

FIG. 16B is a schematic cross-section view taken along the line 16B-16B of FIG. 16A.

FIG. 16C is a perspective view of an illustrative assemblage of a plurality of fuel elements of the type shown in FIG. 16A.

FIG. 16D is a fragmentary top view enlarged in size of the fuel element assemblage illustrated in FIG. 16C.

DETAILED DESCRIPTION OF THE PREFERRED EMBODIMENTS

Figure 1:
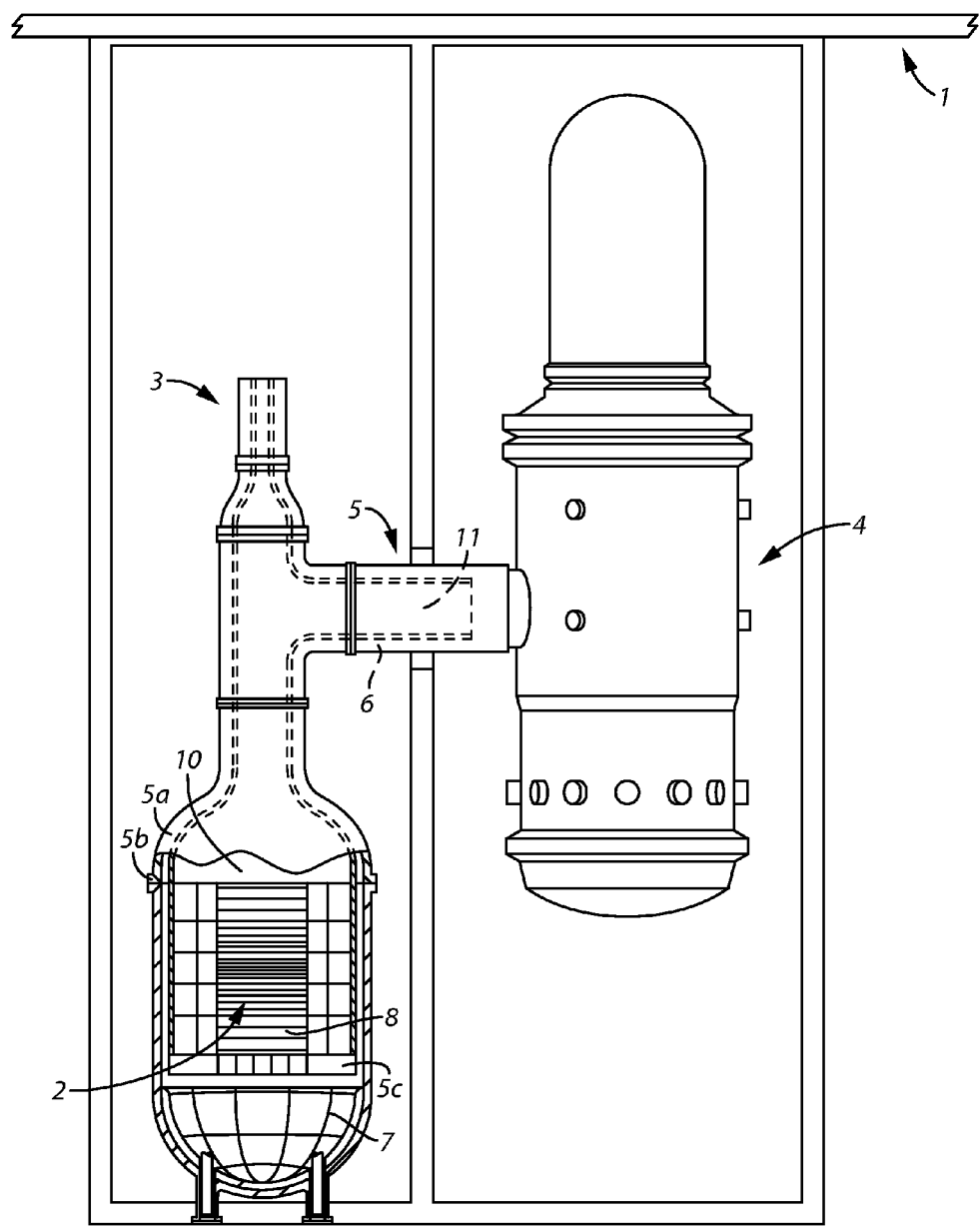
FIG. 1 schematically illustrates one embodiment of an illustrative modular nuclear fission waste conversion reactor.

Shown hereinafter are embodiments of modular nuclear fission waste conversion reactors and methods for their operation which embody various features of the invention.

Reactor System

As depicted schematically in FIG. 1, a nuclear fission waste conversion reactor module of this type may be located below grade (1). The reactor system suitably includes a vessel (5a) containing a nuclear fission waste conversion reactor core (2) and a heat removal or extraction system (3), which employs a helium coolant and is operatively coupled in fluid communication to at least one heat exchanger (4) or some alternative heat extractor/converter. The reactor vessel (5a) and the heat converter (4) may be coupled by a cross-duct (5) that comprises inner and outer flow passageways (11) and (6). Heat converters (4) may include a heat exchanger, such as a steam generator; alternatively, they may include a fluid-driven turbine-generator or the like, such as would provide a continuous output of electrical power.

The overall reactor system generally comprises the fueled core, the reactor vessel internal structures, helium coolant and coolant service system, reactor instrumentation and control, and shutdown heat removal systems. The outer reactor vessel (5a) may be conventionally divided into upper and lower parts connected by a welded flange (5b). The lower part, shown in FIG. 2, contains the reactor core (2), reflector-core support (5c), and control devices. The upper part would contain a riser leading that connects to the shutdown cooling system connections, in the upper region, and to the coaxial cross-duct (5) heat converter, as seen in FIG. 1, which illustrates one embodiment of such a modular, nuclear fission, waste conversion reactor.

Figure 2:
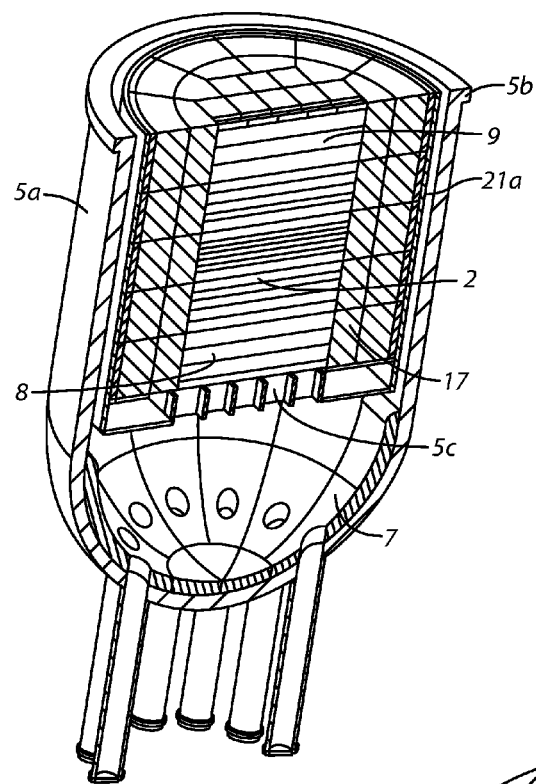
FIG. 2 is a cross section perspective view of the reactor body and core shown in FIG. 1.
Figure 3:
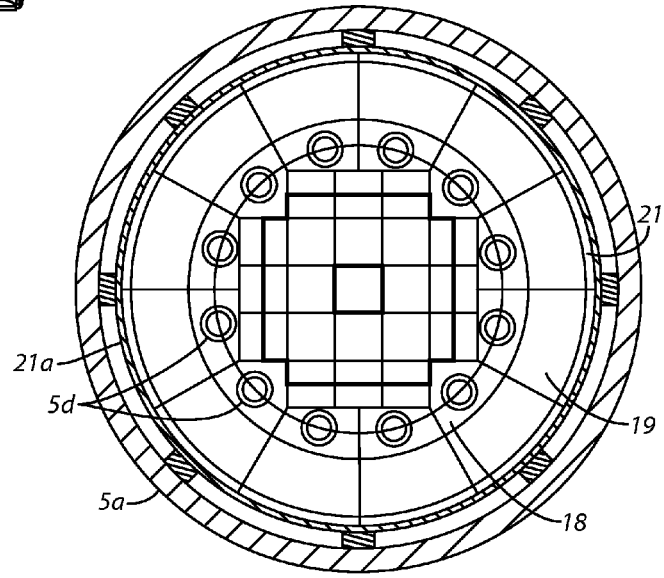
FIG. 3 is a schematic cross section of the FIG. 2 reactor taken at about mid-core level.

During normal operation, cool helium (at about 490° C. to 500° C.) enters the vessel (5a) through the outer region (6) of the cross-duct. The cool helium flows downward along the interior wall surface of the reactor vessel (5a) to keep the vessel cool. The helium flow makes a 180 degree turn at an inlet plenum (7) at the bottom of the core and then flows upward through a core support structure support (5c) and a bottom reflector (8). The reactor core (2) includes fuel assemblies, reflector elements, a neutron shield, startup neutron sources, and reactivity control components, all of which are located within a tubular core barrel (21a) and supported by the core support structure (5c), as illustrated in FIGS. 2 and 3. The helium coolant travels upward from the plenum (7) through the active core (2) and through a top reflector (9) before exiting the core through a top plenum (10). The exiting high temperature helium (about 850° C. or above) flows through an inner insulated region (11) of the cross-duct (5) to enter the heat exchanger (4).

Cladding and Structural Materials

Cladding and structural components of the nuclear fission waste conversion reactor are preferably made of ceramic material so as to withstand high flux and temperature conditions in the core. Ceramic materials are expected to be adequately resistant to creep and corrosion over the envisioned lifetime of full power operation and provide mechanical workability.

Figure 4A:
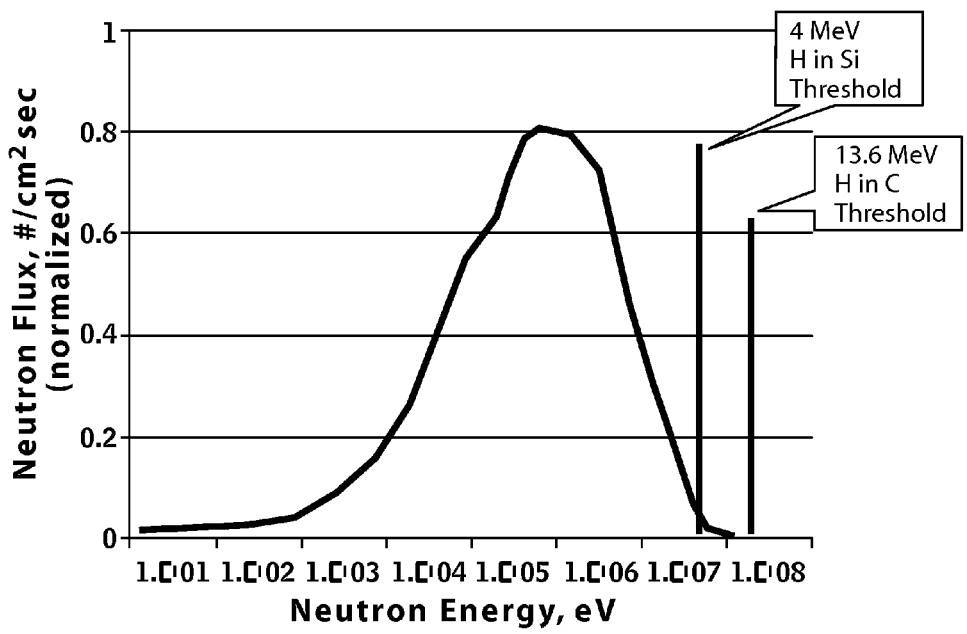
FIG. 4A is a graph that plots neutron energy spectrum versus neutron flux for a modular nuclear fission waste conversion reactor, such as that depicted in FIG. 2.

FIG. 4A shows a plot of the neutron energy spectrum vs. neutron flux for one embodiment of such a modular fission nuclear waste conversion reactor. Neutrons that have not been slowed to thermal energy levels are used for conversion of fertile to fissile material and for subsequent fission of fissile material, and such is achieved by the construction and use of core materials that do not significantly absorb or moderate neutron energy.

It is well known that ceramic materials, such as silicon carbide, have a low absorption cross-section for various neutron energies which is lower than that of other relevant materials. Silicon carbide (SiC) also has a higher average atomic weight than pure graphite materials; this reduces the amount of neutron-slowing per scattering interactions. Moreover, carbon and silicon respectively have low cross-sections for absorption for neutrons in the energy range that will be present in a modular fission nuclear waste conversion reactor which is the subject of this application.

Figure 4B:
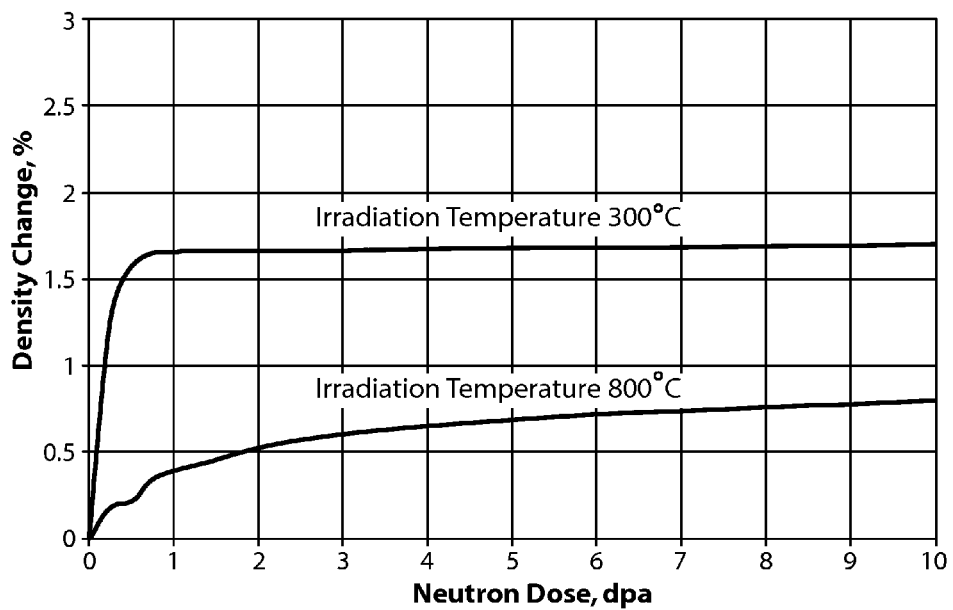
FIG. 4B is a graph that plots density change versus neutron dose for silicon carbide.
Figure 4C:
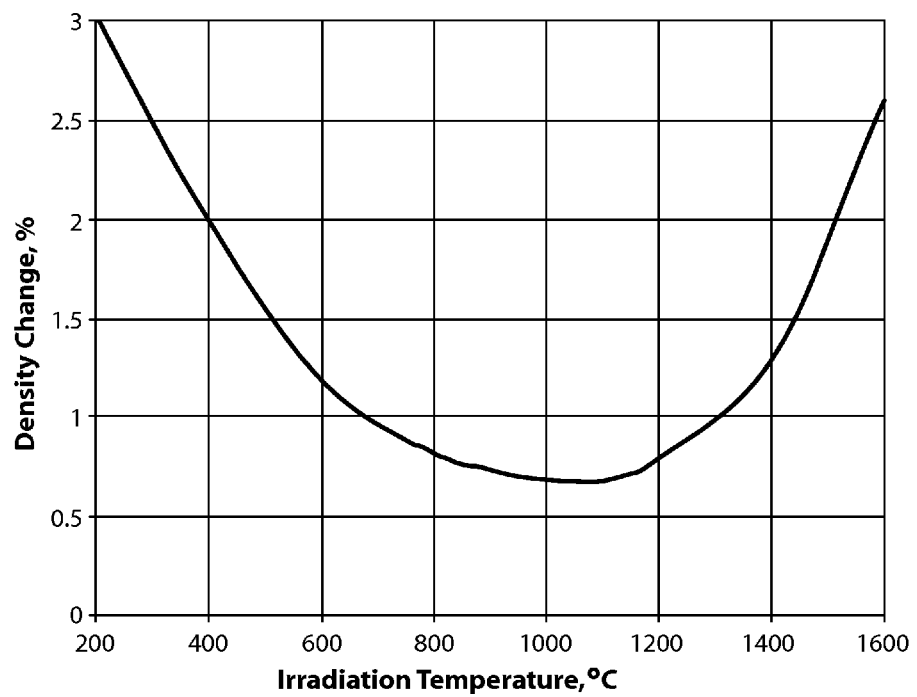
FIG. 4C is a graph that plots density change versus irradiation temperature for silicon carbide.

The modular nuclear fission waste conversion reactor fuel cladding and structural materials are chosen for their ability to retain functional performance throughout their operational lifetime within the core. FIG. 4B shows that silicon carbide exhibits low density change due to neutron fluence, and that these values become stable as displacements per atom (dpa) increase. FIG. 4C shows that the magnitude of such density change can be minimized by operation of the reactor core within an optimum temperature range.

Fuel Element and Fuel Element Assembly

The modular nuclear fission waste conversion reactor fuel is preferably loaded with fuel that is in carbide form, i.e. preferably monocarbide blended with a minor amount of dicarbide, e.g. uranium monocarbide with a minor amount of dicarbide is referred to as ($UC_{1-x}$). The excess carbon in the immediate fuel region allows for chemical reaction with fission products to safeguard against chemical attack on the fuel element cladding. The fuel is preferably in the form of a sintered body that may have a packing density of about 50 to 80 volume % and preferably, about 60 to 80 volume %. Thus, the sintered fuel bodies preferably have at least about 20% and preferably between about 20% to 40% interconnected porosity to provide room for deposition of solid fission products while assuring pathways for migration of fission product gases within the fuel region or meat and providing for escape through a vent port (15) throughout reactor lifetime. The carbide fuel may be in the form of a solid sintered plate which is continuous and provides good thermal conductivity to the exterior surface of the fuel element (12). Sintered short cylinders of nuclear fuel may alternatively be used as described hereinafter.

Figure 5:
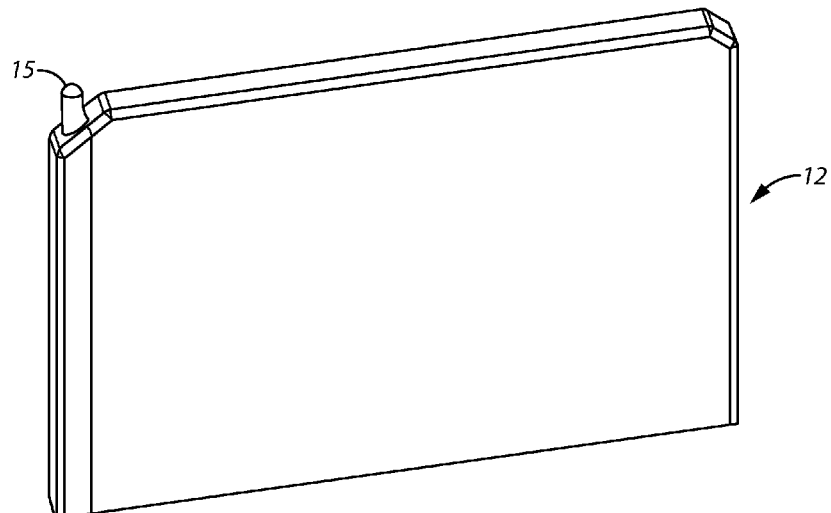
FIG. 5 is a perspective view of an illustrative individual fuel element in flat plate form.
Figure 6:
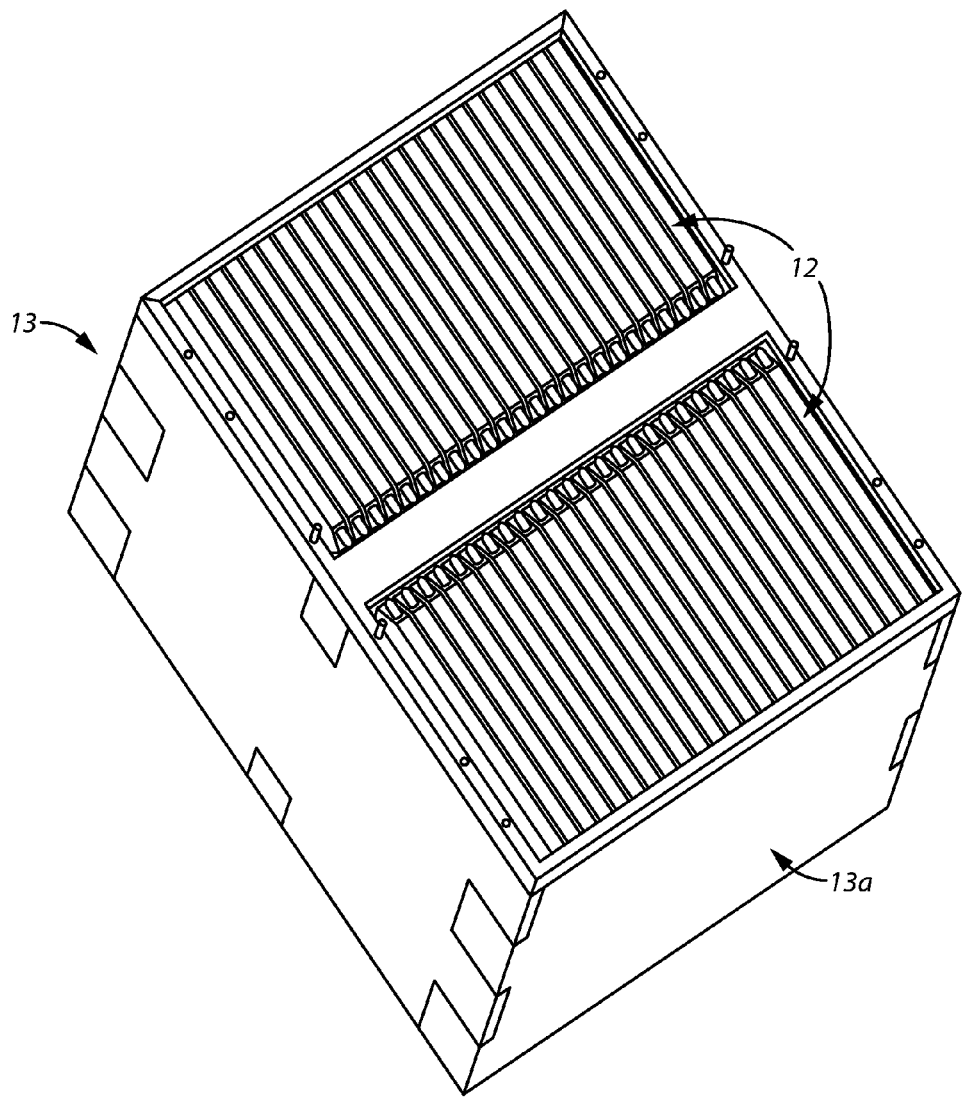
FIG. 6 is a perspective view of an illustrative fuel element assembly containing 48 of the fuel elements of FIG. 5.
Figure 7:
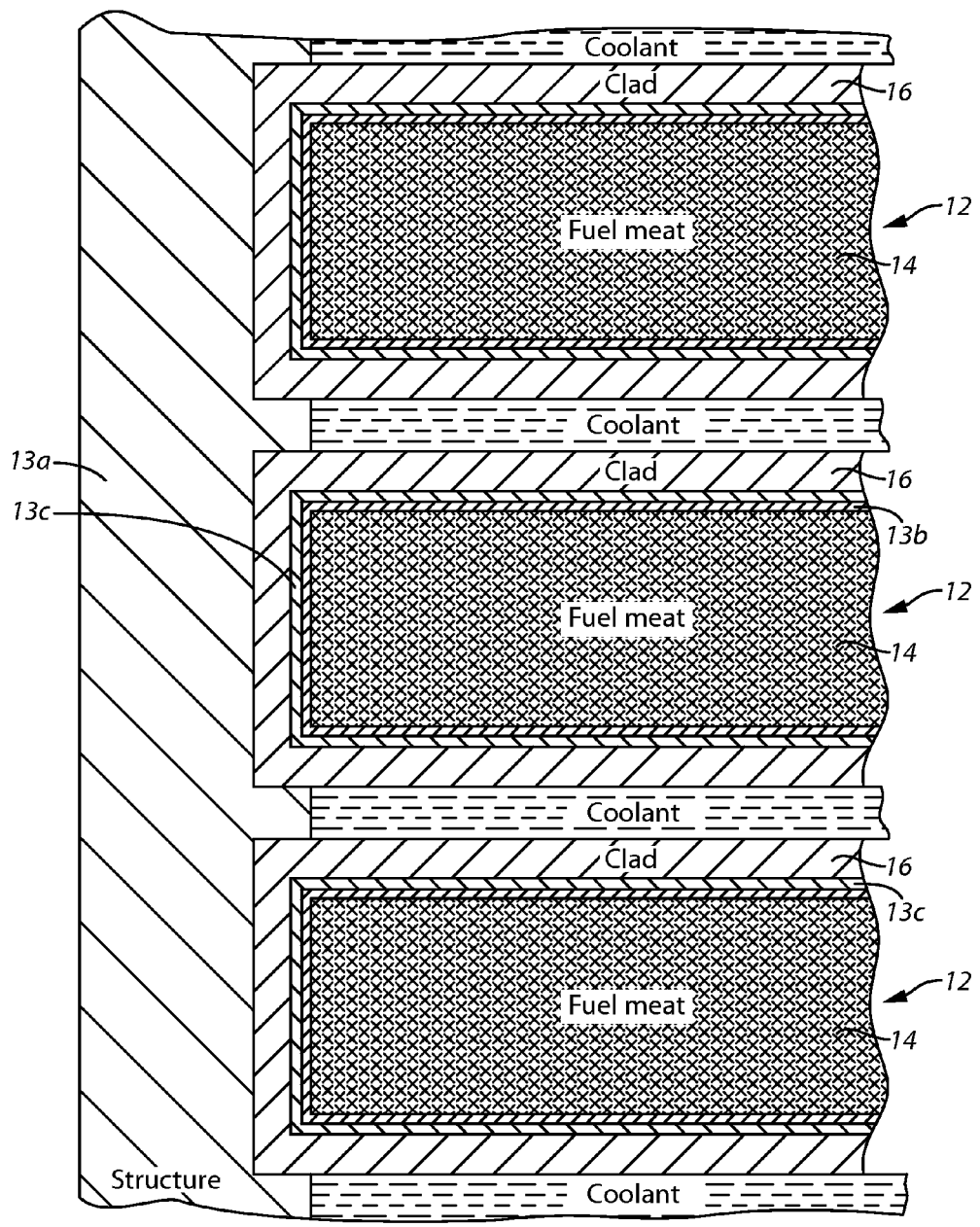
FIG. 7 is a fragmentary view, enlarged in size, showing the internal construction of an illustrative fuel element and a holder in which it is supported such as the assembly of FIG. 6.

FIG. 5 is an illustrative embodiment of one embodiment of an individual fuel element (12) containing such a flat plate, showing its exterior casing and the prominent vent port (15). FIG. 6 is a schematic view of an illustrative embodiment of a boxlike fuel assembly (13) wherein a plurality, e.g. 48, of individual fuel elements (12) of this type are contained within a surrounding frame or holder (13a) preferably constructed of silicon carbide composite materials. The fuel elements (12) are received in slots in the frame and are preferably securely attached to the frame as by use of an annealing process that ensures a continuous, hardened structure, as depicted in FIG. 7, which also shows the internal construction of such fuel elements (12). As one representative embodiment, a holder (13a) about 43.3 cm. square and 16 cm. deep may hold two rows of such flat fuel elements (12).

The central sintered carbide fuel plate (14) in this embodiment of a fuel element has interconnected porosity to provide adequate room for deposition of solid fission products and to allow the passage of volatile fission product gases to the vent port (15). The vent port (15) is preferably located at one corner, as depicted in FIG. 5, and such enables connection to a common connector or header (not shown) for each group of fuel elements in one or both halves of a holder 13a. Such connector serves as a manifold and forms a part of an overall fission gas collection system designed to remove volatile fission products from the core region. Over its planned lifetime, less than half of the void volume in the sintered carbide fuel plate (14) will become filled with solid fission products leaving ample room for volatile fission product flow. The flat carbide fuel plate (14) is preferably coated on its exterior surfaces with a carbide fuel slurry that forms a inner smooth heat transfer surface layer (13b) of uranium carbide or the like and then optimally with an outer layer of pyrocarbon (PyC) (13c); such PyC seals the fuel plate surface and allows subsequent cladding of the fuel plate in a vaporous SiC atmosphere. The structural plate cladding (16) forms a closed outer container and is made of silicon composite material, e.g. multiple layers of cross-woven, high purity SiC material that is then infiltrated with β-SiC, during which infiltration process the dense pyrocarbon wrapper seal prevents chemical reaction with the fuel. As an alternative embodiment, a sintered carbide fuel plate (14) that has been coated with such a smoothing layer (13b) may be snugly fit within a separately formed silicon carbide clad or jacket that has been mechanically assembled and then sealed to form the fuel element (12).

Because thermal conductivity of near-monocarbide fuels improves (rises) as temperature increases, the result is a reduction of the temperature rise across the fuel plate during operation at higher temperatures.

Reflector

Figure 8A:
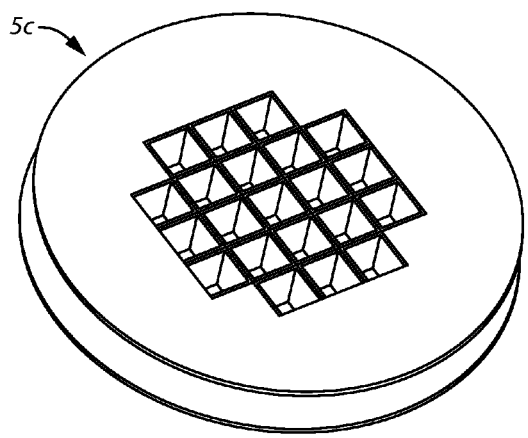
FIG. 8A is a perspective view of a core support plate as might be used in the FIG. 1 reactor.

Such an overall assemblage of such boxlike fuel assemblies (13) is surrounded on all sides by reflector assemblies. The purpose of such reflectors is to minimize neutron leakage by returning neutrons to the central reactor core, which improves neutron economy and allows an increased probability of either converting fertile fuel to fissile fuel or to causing fissile fuel to fission. The use of reflector materials having a high neutron scattering cross-section and low absorption cross-section, such as beryllium and graphite, increases the efficiency of the reflector. The core and the surrounding reflectors are supported on the reflector-core support (5c) as seen in FIGS. 1 and 2; a representative support is shown in FIG. 8A which contains 21 rectangular openings through which there is upward coolant flow.

Figure 8B:
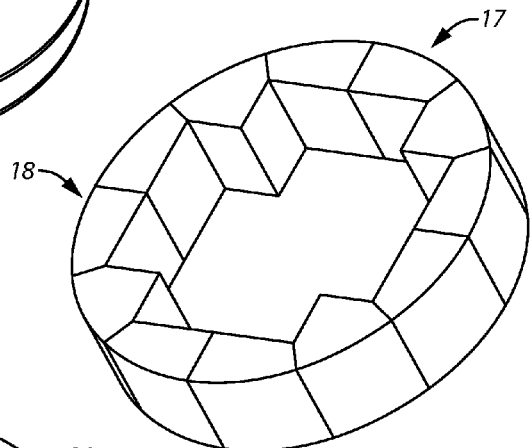
FIG. 8B is a perspective view of an illustrative inner reflector ring assembly that might be made of BeO blocks of complementary shapes that might surround one layer of the reactor core as seen in FIG. 2.

The reactor generally contains 2 main types of reflector materials: (1) a material containing beryllium, such as BeO or $Be_2C$, and (2) graphite Immediately surrounding the fueled core is an inner reflector assembly (18) (see FIG. 8B) containing beryllium that is preferably composed of a plurality of individual blocks (17) of two different shapes which interfit with one another; such blocks (17) of BeO or $Be_2C$ can be provided in various cross-sectional shapes and thicknesses as required to surround the fuel assemblies in the core and create an inner reflector assembly that is preferably shaped to provide an outer surface that is a section of a right circular cylinder. FIG. 8B is an illustrative perspective view of one horizontal layer of such an inner reflector assembly (18) formed of such blocks (17) which would surround one horizontal array within the reactor core comprising 21 fuel element assemblies of the types shown in FIGS. 6 and 7.

Figure 8C:
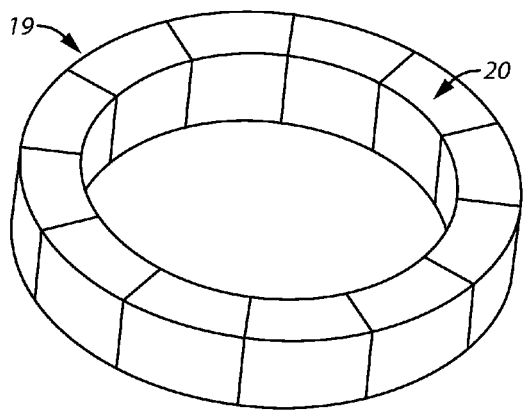
FIG. 8C is a perspective view of a section of the outer reflector assembly adjacent the FIG. 8B ring.

Located adjacent to and immediately radially outward of the inner reflector assembly (18) is an outer reflector assembly (19). FIG. 8C is an illustrative embodiment of one such assembly which is made of twelve graphite blocks (20). Such graphite blocks may be formed in standard shapes and thicknesses as desired for a particular reactor core.

Figure 8D:
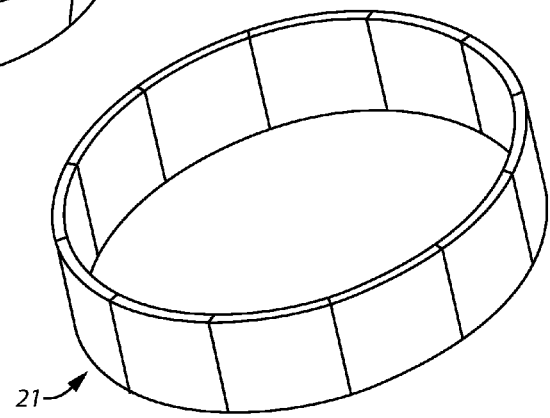

The graphite reflector assembly (19) is preferably surrounded by a neutron shield (21) which contains neutron-absorbing material or neutron poisons, such as boron carbide ($B_4C$) or other such poisons. FIG. 8D is an illustrative embodiment of one such shield (21) of neutron-absorbing material formed of relatively thin plates of arcuate shape. The top and bottom reflector assemblies (9) and (8), mentioned with respect to FIG. 2, are preferably made of graphite; they are located above and below the core and are discussed hereinafter.

Figure 9:
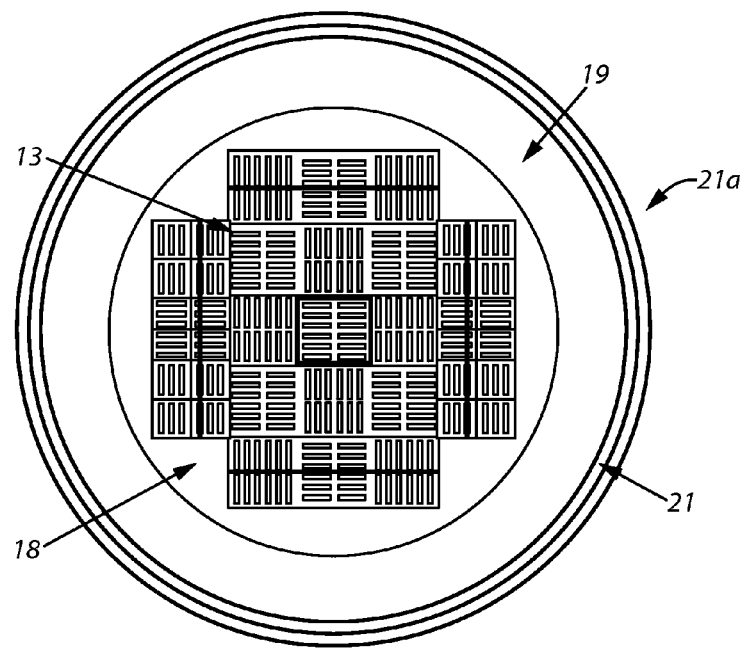
FIG. 9 is a cross section view through an illustrative reactor core within its surrounding tubular core barrel.

FIG. 9 is a schematic cross sectional view similar to FIG. 3 showing the circumferential reflector assemblies (18) and (19) and the neutron shield (21) in surrounding relationship around the core disposed within a tubular core barrel (21a). Shown are 21 fuel assemblies (13) of square cross section that are vertically aligned above the 21 openings provided in the core support structure (5c), best seen in FIG. 8A.

Initial Fissile and Conversion Sections

Figure 10:
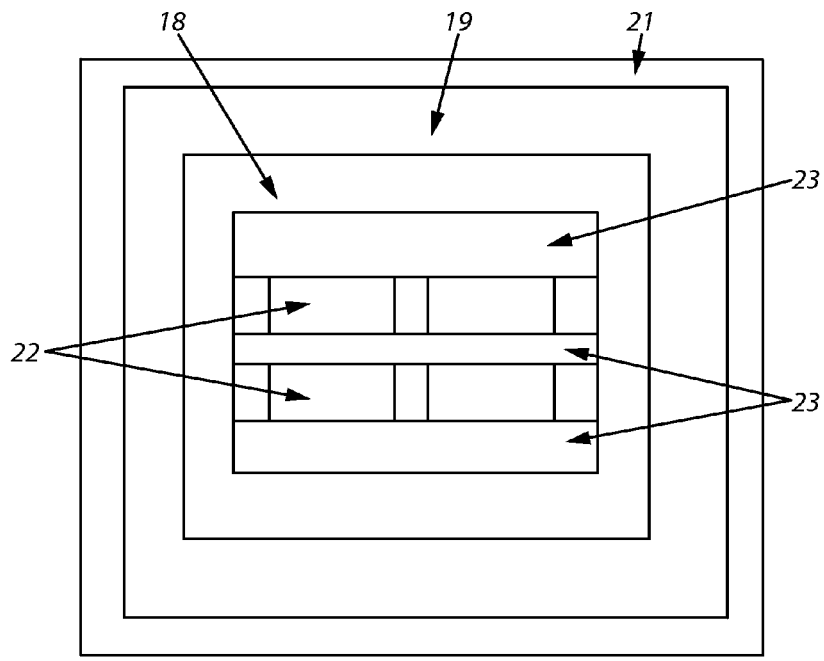
FIG. 10 is a schematic view taken vertically through an illustrative reactor core which contains two initial fissile sections flanked by upper, central and lower fertile conversion sections.

The modular nuclear fission waste conversion reactor initial core comprises separate fuel sections. FIG. 10 is a conceptual schematic illustration of one such stratified region concept which employs two split, i.e. spaced-apart, initial fissile sections (22) and contiguous, flanking fertile conversion sections (23). The arrangement uses a plurality of horizontal regions which in this embodiment are provided by arrays of 21 fuel assemblies (13).

Figure 11A:
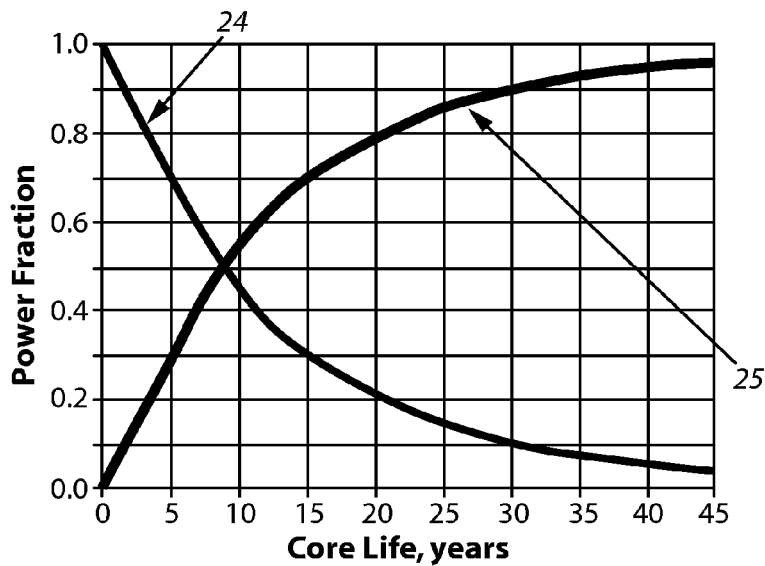
FIG. 11A is a graph which plots the power fraction versus core life for a nuclear fissile section compared to a conversion section.

Fissile sections may contain low-enriched uranium (LEU), a down-blend of weapons-grade plutonium (WPu), or other such fuel material, generally containing between about 8% and about 18% fissile nuclides. FIG. 11A is a graph showing the fraction of power throughout core lifetime that is contemplated to be derived from the initial fissile sections (see ref line 24) compared to the fraction of power derived from the conversion sections (see ref line 25). At the beginning of core lifetime, the critical fission reactions within the core occur within the initial fissile sections (22), which in the illustrated embodiment include the two spaced-apart annular regions of fissile fuel assemblies (13). Over core lifetime, excess neutrons from the two fissile sections (22) convert U-238 in both the fertile conversion sections (23) and in the fissile sections (e.g. in LEU) to Pu-239. As a result, the critical region of the core expands, extending to provide additional positive reactivity and compensate for the negative reactivity derived from the presence of fission products. The power density ultimately expands in essentially all directions from the initial fissile sections (22) to now include the various conversion sections (23) along with the two initial fissile sections.

The percentage of energy being obtained by subsequent fissioning of what was initially fertile fuel, that has now been converted to fissile fuel, increases over core life. Before the end of the first decade of operational life, more energy is being obtained from fissioning of converted fertile fuel than from fissioning of the fissile fuel which was initially loaded into the core. As can be seen in FIG. 11A, by the end of operational life, the vast majority of energy is being generated from the fissioning of converted nuclides; however there is still some contribution from the initial fissile nuclides which remain a part of the expanded core.

Figure 11B:
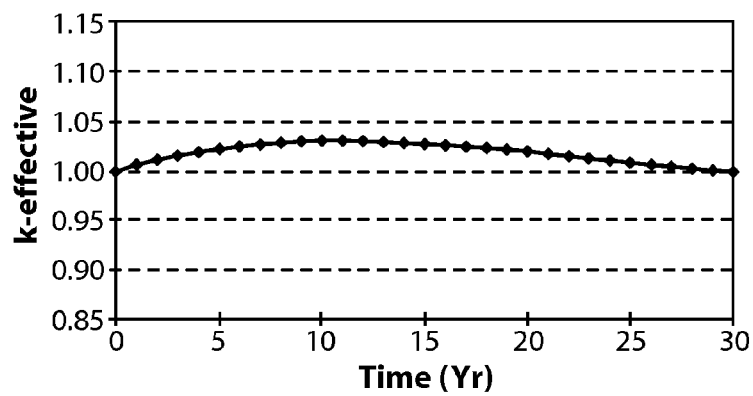
FIG. 11B is a graph which plots k-effective versus time for a first generation modular nuclear fission waste conversion reactor core with an LEU fissile section and a DU conversion section.

FIG. 11B is a graph which may be illustrative of the effective multiplication factor, k-eff, vs. time for a first generation core with an LEU fissile section and a DU conversion section. It is contemplated that the reactor will remain critical for over 30 years at substantially continuous, full 100% power operation. During this time, the maximum reactivity swing is only about 3.6%.

Figure 11C:
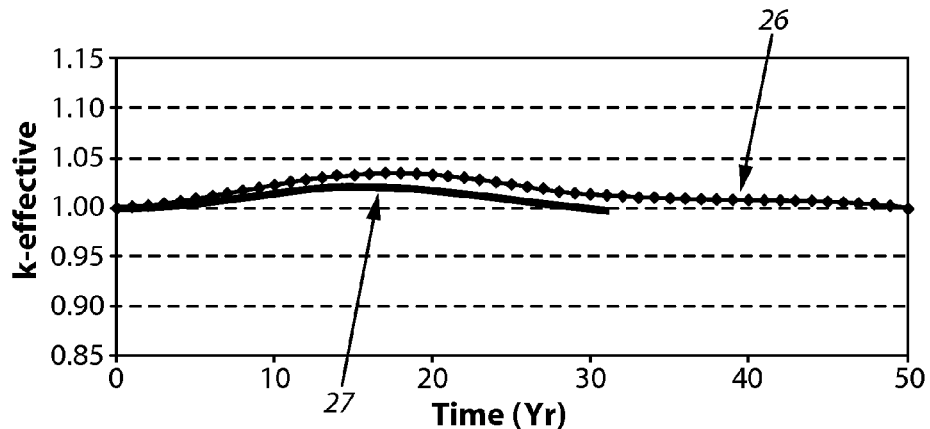
FIG. 11C is a graph which plots k-effective versus time for similar embodiments that utilize depleted uranium and nuclear spent fuel conversion sections.

The illustrative modular nuclear fission waste conversion reactor core has minimum excess reactivity with an expected value of less than 5% throughout operational life. This is significantly lower than existing reactors and provides advantages, such as reduced control system requirements, reactivity addition accident scenarios with reduced impact, and the ability to design control systems to operate in the reflector instead of in the core region. Control drums (5d) may be located within the confines of the inner reflector assembly (18) as depicted in FIG. 3. FIG. 11C is a graph illustrating expected modular nuclear fission waste conversion reactor reactivity values for an embodiment that would utilize DU (ref line 26) or nuclear spent fuel (ref line 27) for the conversion section fertile materials.

Multi-Generational Fuel

Certain nuclear fuels that are envisioned for use in embodiments of the modular nuclear fission waste conversion reactor are typically widely available; they include, but are not limited to, uranium (natural, depleted, or enriched), plutonium and other transuranics, and previously-burned nuclear fission fuel assemblies (spent nuclear fuel). Uranium and thorium are among the various types of fissile section fuels and conversion section fuels which may be used. Other, less widely available nuclear fission fuels, such as other actinide elements, may also be used. Some embodiments of such a modular nuclear fission waste conversion reactor contemplate long-term operation at full power on the order of about ¼ century to about ½ century, and a unique aspect of the modular nuclear fission waste conversion reactor is that it does not require nuclear refueling or fuel shuffling, i.e. repositioning of fuel elements, during operational life.

At the end of operational life, significant Pu will remain with a small amount of other actinides, principally Np, Am and Cf, as a result of which the overall concentration of fissile nuclides should be higher than the original overall concentration of fissile nuclides for the first fuel loading. This should allow for reuse of the fertile and fissile heavy metal material in a next generation reactor. After removal of 30-90% of the fission products from the fuel, preferably at least about 60% thereof, and the addition of some nuclear waste material (depleted uranium or spent nuclear fuel), there should be ample fuel for a new generation core having about the same total fuel weight as the original core, to permit recycling into such a follow-on reactor core.

Some advantageous features of various embodiments of the modular nuclear fission waste conversion reactor result from the above considerations. For example, reactor operation for ¼-½ century at full power can be achieved without nuclear refueling, and by using neutrons that have not slowed to thermal energy levels, nuclear fuel reprocessing can be avoided. As a further example, some embodiments of these modular nuclear fission waste conversion reactors permit a high average burn-up of non-enriched actinide fuels, such as spent nuclear fuel or depleted uranium, and these require the use of a comparatively small nuclear fissile region of moderately isotopic-enriched fissile fuel in the core's initial fuel charge for the first generation core.

Figure 12:
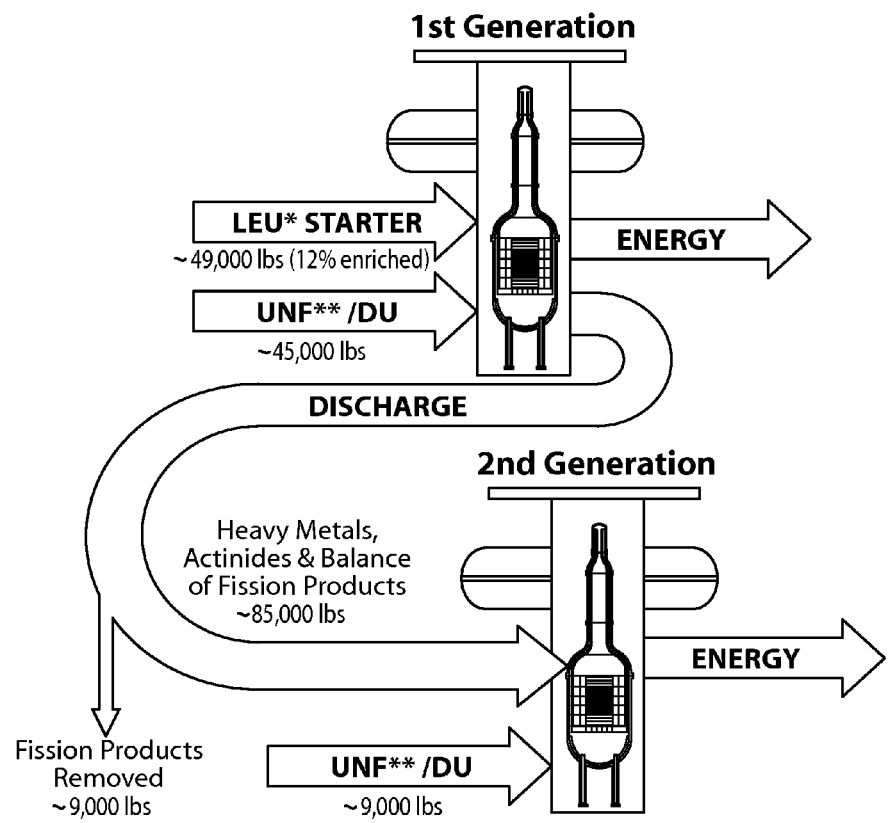
FIG. 12 is a flow chart which illustrates one embodiment of a two-generational life cycle showing fuel types that may be employed in the initial fissile sections and in the conversion sections in two generations of reactor cores.

FIG. 12 schematically illustrates the multi-generational life cycle of such a modular nuclear fission waste conversion reactor system. The initial fuel load of the fissile sections may contain low enriched uranium (or other fissile fuel), and the conversion sections may contain nuclear waste (spent nuclear fuel, depleted uranium or other suitable waste). The overall initial enrichment of the core of such a modular nuclear fission waste conversion reactor may be not much greater than that of a light water reactor (LWR); however, the core will achieve much higher fuel burnup during its operational life. For example, the carbide fissile fuel may contain between about 4% and 18% enrichment, e.g. 8-18%, and as previously discussed, subsequent generations of such modular nuclear fission waste conversion reactors should not require additional enriched uranium.

After decades of operation at rated power, the modular nuclear fission waste conversion reactor fuel is removed. After some period of time for highly radioactive fission products to decay, the fuel is separated from the structural and cladding material, and some fraction of the fission products, e.g. preferably at least about 60%, are removed. The remaining heavy material (fissile heavy metals, fertile heavy metals and remaining fission products) is fabricated into new fuel elements (12) together with some additional nuclear waste material, e.g. spent nuclear fuel or DU, to provide the next generation modular nuclear fission waste conversion reactor core.

The above process is modeled to continue for several generations. The net effect is a system that (after the first generation) adds only nuclear waste material to the next core while providing substantially continuous output of energy during operational life and requiring only the removal of some solid fission products after the end of its operational life of several decades. The modular nuclear fission waste conversion reactor design supports next generation operation over a range of fission product removal efficiencies; however, the end of efficient operational life is considered to have been reached once a certain level of fission product accumulation has occurred. Therefore, operational life and fission product removal efficiency are directly related.

Fission Product Collection System

Figure 13:
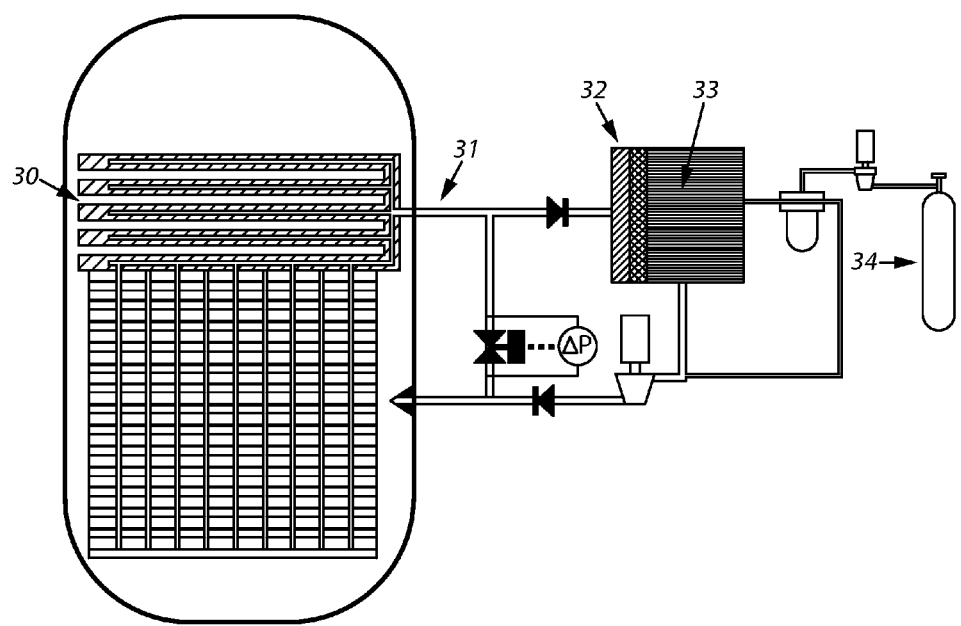
FIG. 13 is a schematic view of an illustrative fission product collection system that might be incorporated into the reactor system of FIG. 1.

If fission product gases were left to build up within the fuel elements, such would likely lead to an over-pressurized condition that might fracture or rupture the cladding. FIG. 13 is a schematic illustrative embodiment showing a fission product collection system which collects and stores volatile fission product gases throughout the operational lifetime of the reactor. Although illustrated with respect to the fuel element assemblies (13), it can easily be incorporated with alternative fuel element constructions. The illustrated embodiment utilizes a network of branches extending to connectors which manifold the 48 fuel elements (12) in each fuel assembly (13); these branches are in turn linked to a series of headers (30) that are connected to a central collector pipe (31). The fission products that are volatile at 500-700° C. and above are transported out of the reactor as gases in the pipe (31) to a filter (32), a separator (33) and a fission product storage system (34).

The fission product collection system is maintained at a slightly lower pressure than the primary coolant; this promotes helium flow inward rather than potential fission product gas flow outward. A small amount of inward helium flow, through even the smallest pinhole in the fuel clad or collection system, will suppress any undesirable counter-diffusion of volatile fission products into the primary coolant system. The fission product gases with any entrained helium collect in the headers (30) and exit the reactor through the central collector pipe (31), which may be located at the top of the core, where the primary coolant at about 850° C. or above. After the fission product gases flow through a particulate filter and membrane or adsorption filter (32) and a separator (33) removing entrained solids and condensates, the bulk of such entrained helium from which the fission products have been purged may optionally be returned to the reactor. Finally, the remaining fission product gases are safely stored in a qualified storage tank (34).

Neutron Economy

The modular nuclear fission waste conversion reactor will likely use reflector material in the form of nuclides that result in a (n, 2n) reaction upon fissioning, such as beryllium (Be). Such reaction occurs when the initial neutron is absorbed and two neutrons are released as a result; it improves neutron economy and compensates for inevitable neutron leakage from the core.

Figure 14:
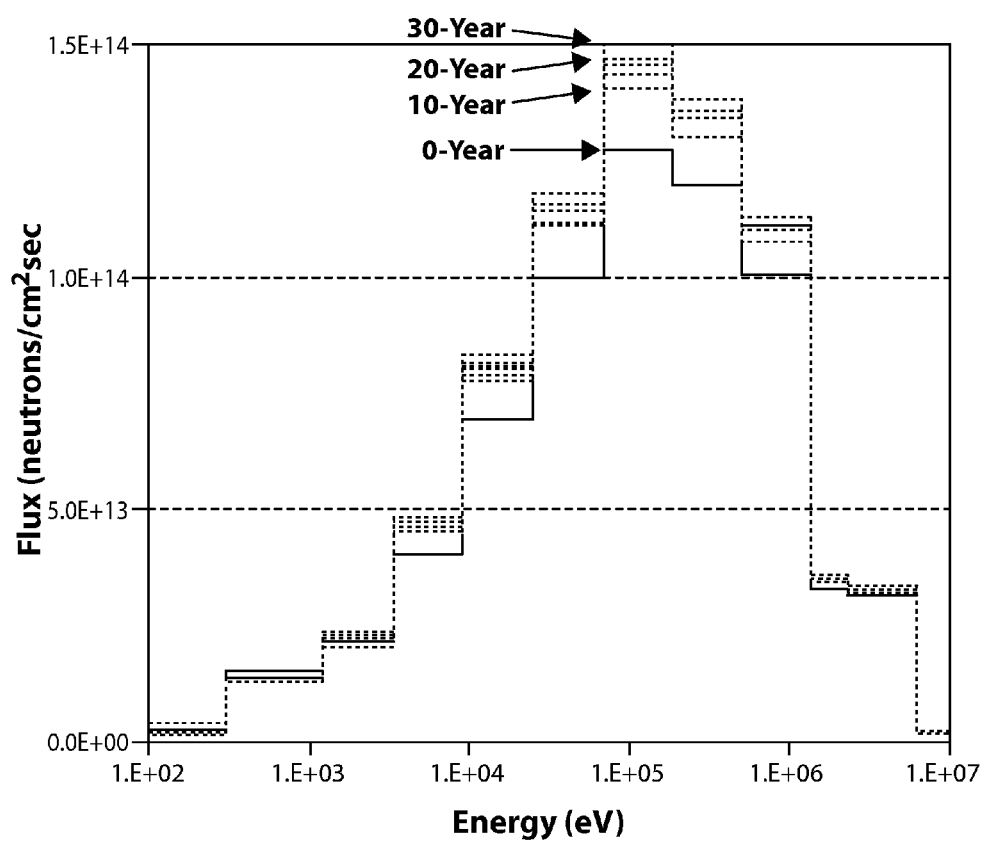
FIG. 14 is a graph which plots neutron flux versus energy for an embodiment of such a modular nuclear fission waste conversion reactor.

FIG. 14 is a graph illustrating a potential neutron flux spectrum demonstrating minimal changes over operational life. The average neutron energy is $10^5$ electron volts. It is contemplated that the neutron spectrum width will thin slightly (i.e. becomes more concentrated near its average) during the first half of operational life, but will return to near starting conditions by the end of operational life.

Reactor Temperature Control

Figure 15A:
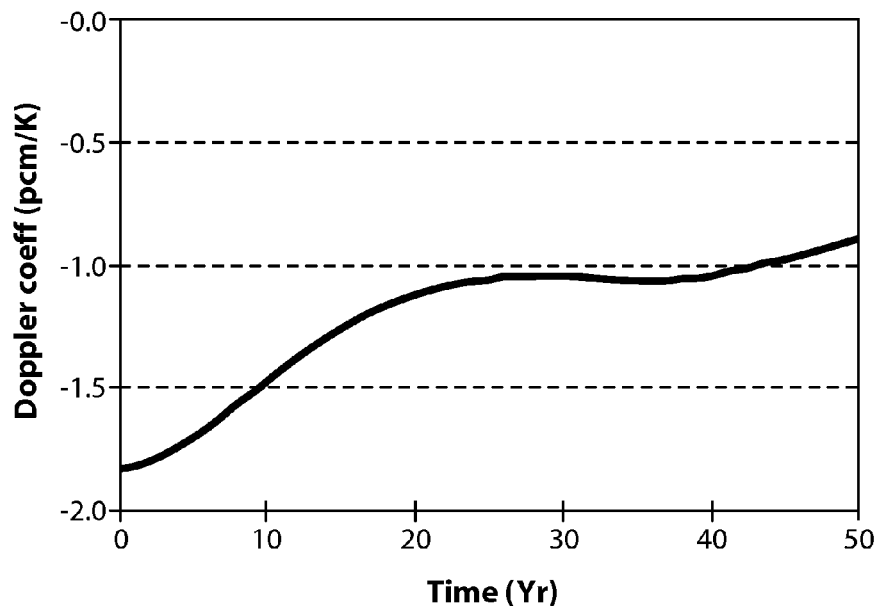
FIG. 15A is a graph which plots the Doppler coefficient versus time for such a modular nuclear fission waste conversion reactor.
Figure 15B:
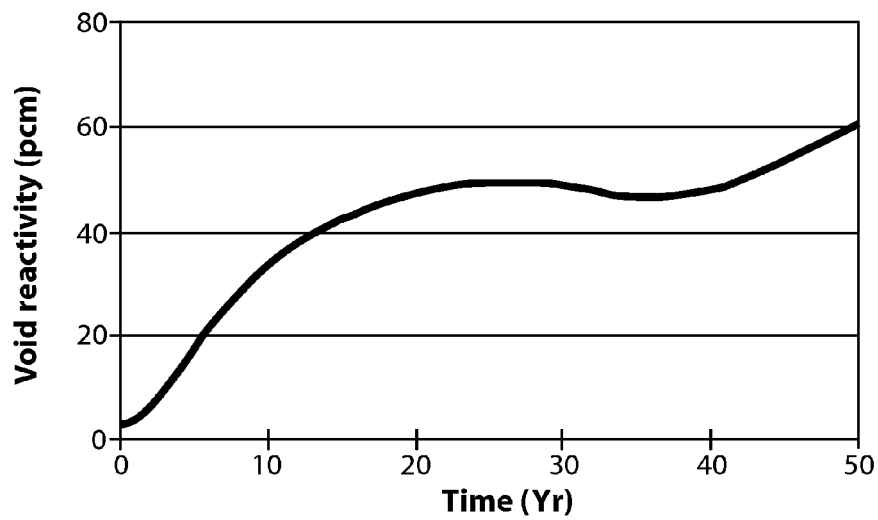
FIG. 15B is a graph which plots the Void coefficient versus time for such a modular nuclear fission waste conversion reactor.

Reactor temperature control and response to reactivity additions provide strong reasons for the design of a reactor with a negative temperature coefficient, which will provide an automatic dampening response to changes in reactivity. FIG. 15A shows that the present modular nuclear fission waste conversion reactor core design provides for a Doppler coefficient that is negative throughout operational life. FIG. 15B shows that the void coefficient is positive, yet it is smaller than the Doppler coefficient. Therefore, the combination of the Doppler and void coefficients results in a negative temperature coefficient over operational life of such a modular nuclear fission waste conversion reactor core.

While individual features of the modular nuclear fission waste conversion reactor may be considered to be conventional, the combination of certain of these features creates a unique reactor design. There are five particular features that are important in achieving such extended operating lifetime in an overall reactor of particular design: (1) SiC cladding, (2) $UC_{1-x}$ fuel type, (3) fissile to fertile ratio, (4) geometry and fuel packing fraction, and (5) gaseous fission product collection system.

The SiC cladding, which forms a closed container that encapsulates such sintered fuel bodies, undergoes only low density changes in the specific temperature range of 700-1000° C. that is maintained within the central region of the reactor core. Moreover, within this temperature range, SiC materials experience a self-annealing process that minimizes damage effects from a high neutron flux environment, such as will be experienced in the nuclear waste conversion reactor. For temperatures significantly below this operating range, there may be insufficient molecular mobility for annealing to occur, and at temperatures significantly above the range, void mobility may increase such that voids may combine and increase density variations. To take advantage of this self-annealing process, silicon carbide cladding is chosen, and the operating temperature of the reactor is maintained between 700° C. and 1000° C. as a result generally of helium coolant circulation and slight rotation of the control drums (5d).

The most viable reactor coolant for the given temperature range is helium. Helium has a number of positive features including being inert and having both a relatively high heat transfer coefficient/thermal conductivity and favorable neutronics. Based upon the use of helium as the coolant, the geometry requirements for coolant channels between adjacent fuel elements of whatever shape are derived in order to allow the fuel elements (12) to be arranged very close to one another so as to assure good heat conduction from the fuel to the flowing coolant to maintain the desired core temperature at the level of the fuel elements themselves.

The fuel, the internal structure of the reactor core and the fuel elements are designed to support use for multiple generations as well as to ensure high fuel utilization during core lifetime and the ability to use depleted uranium (DU) or spent nuclear fuel. It is important that the fuel is primarily a carbide, e.g. $UC_{1-x}$, rather than typical uranium fuels having two attached atoms, such as $UO_2$ or UCO. One advantage of this is to provide more uranium loading per unit volume. However, having some excess carbon present in the immediate fuel region is advantageous, and at least about 5% excess is preferred. Excess carbon is preferably provided by providing more than one carbon atom per nuclide, on the average. This carbon excess in the intimate vicinity of the heavy metal nuclides deters potential chemical attack on the SiC cladding or other surrounding materials by fission products (two of which are generated per fission). Thus, a lower limit of carbon to uranium ratio is preferably chosen that will prevent such chemical attack, whereas an upper limit of carbon to uranium is preferably not exceeded in order to minimize neutron over-moderation. Although the fuel may, for example, be about $UC_{1.0}$ to $UC_{1.5}$, a fuel ratio of preferably $UC_{1.05}$-$UC_{1.3}$ is selected when the presence of $UC_2$ in the fuel meat is used to provide the excess carbon. Carbon is also preferably present in the region between the outer surface of the sintered flat fuel plate (14) and the outer SiC cladding (16) for manufacturing purposes when flat plates are used in the fuel elements.

Both the fissile and the fertile fuel elements of the type illustrated are made by encapsulating sintered, near-monocarbide fuel plates having the desired packing density within exterior containers that will retain their strength and integrity throughout the lifetime of the reactor over a period of several decades. It is expected that reactor operation will be substantially continuous and will produce usable energy without refueling. Some fission products will become deposited in the interstices of the near-monocarbide fuel, whereas others will migrate from the fuel, out of the fuel element (12) through the exit ports (15) and enter into the fission product collection system. The clad material is chosen for its ability to self-anneal and avoid substantial density changes; it is preferably silicon carbide. Woven silicon carbide cloth material can be used to either create pockets into which a sintered fuel plate will be received, or such cloth can be used to wrap the entire exterior of the fuel plate with the valve port protruding from one upper end. The totally encompassing SiC wrapper is then made impervious via deposition of crystalline beta silicon carbide material using a high-temperature vapor deposition process.

Because the chemical reactants used in such vapor infiltration or deposition of silicon carbide are potentially deleterious to monocarbide fuels, prior to the encapsulation of such a fuel plate (14) in such a surrounding body of woven silicon carbide cloth, first a smooth layer of uranium monocarbide or the like and then a seal layer of pyrocarbon are coated on the entire outer surface of the plate. Optionally, the small region where the exit port (15) will be located may be either protected by installation of an exit port fitting or otherwise masked. With the carbide fuel plate protected by such an exterior carbon seal layer and disposed within the encompassing silicon carbide woven body, the subassembly is subjected to gaseous vapor deposition under conditions to deposit silicon carbide throughout the interstices of the entire encapsulating body to create a monolithic solid container made essentially completely of crystalline silicon carbide. The resultant silicon carbide claddings should have a thickness of at least about 1 mm, and preferably it is about 2 to 3 mm thick. Such vapor-deposited silicon carbide also provides an excellent solid heat flow path from the pyrocarbon layer sealing the exterior surface of the sintered fuel plate through to the outer surface of the flat fuel element (12); thus, a very good heat transfer conduction path is facilitated to the outer surface where the heat of fission is transferred to the flowing helium coolant stream as depicted in FIG. 7. The amount of carbon in the seal layer can be considered for some contribution in determining the final amount of excess carbon to be employed.

All heat generated by the fissioning fuel must be removed from the reactor core via thermal conduction through the fuel plates, across the SiC clad and adjacent structure, into the helium coolant. The allocation of fissile material is determined by a set of complex limitations, such as the ability for the core to remain critical, the desire to limit maximum temperature during a potential casualty and the desire for the initial fissile sections to remain an active part of the operational core for its desired lifetime. Fertile material is used in the remaining fuel areas to achieve the overall functional requirements. A delicate balance of fertile and fissile fuel allows the reactor to support multiple generations, to utilize relatively high fuel concentration, and to use DU or spent nuclear fuel as fertile material.

Fission product gases are created through the fission process, and to ensure such a novel, long life core, fuel elements are designed to allow for removal of such volatile fission products. The incorporation of fission product gas release and removal not only prevents a potential overpressurized condition, but it removes chemical elements that could detract from overall operational efficiency, i.e. reactivity, if left within the core.

To accommodate solid fission products, the packing fraction of the sintered fuel body is carefully controlled in designing the reactor core. Packing fraction may be defined as the ratio of space filled with fuel divided by the space available within the fuel element container; it can be expressed as volume %. A packing fraction upper limit is established to provide adequate volume for the additional space required as a result of the conversion of one uranium atom to two fission products during fission while retaining sufficient interconnected porosity so that volatile fission products will always be able to migrate to the fission product gas collection system for the entire life of the fuel element. A packing fraction lower limit is established to maximize fissile and fertile material in the reactor core while including adequate carbon within the available fuel space and to ensuring good thermal conductivity. To achieve these objectives, it is found that the packing fraction or packing density should be between 50% and 80% and preferably between 60% and 80%. Conversely, there would be at least about 20% interconnected porosity, and at a packing density of about 60%, there would be about 40% void space in the sintered body.

Although in FIGS. 1-3, the illustrative reactor is shown as having a cylindrical core, it should be understood that no limitation to such a geometric arrangement or to any geometric arrangement of any type whatsoever is intended. Such a modular nuclear fission waste conversion reactor module suitably includes a reactor core and a reactor coolant system. Each such reactor module is operatively coupled in fluid communication to at least one heat converter via its reactor coolant system. Such reactor modules can each be considered as a complete, stand-alone reactor by itself, or several such reactor modules may be coupled together. If desired, such coupled modules might use a common energy conversion system.

As discussed above, the nuclear fission waste conversion reactor modules utilize neutrons that have not slowed to thermal energy levels. To that end, at least one portion of such a modular reactor core includes fertile fuel material as part of a conversion section or sections. A separate portion of the reactor core includes one or more sections where the fuel material is fissile fuel. Upon initial start-up of such a reactor, the core fissile section or sections 22 provide excess neutrons to the core conversion section or sections 23. The core conversion sections 23 then slowly become converted to fuel containing a large fraction of fissile nuclides so as to provide a large part of the fission power of the core.

The modular nuclear fission waste conversion reactor core is a neutronically "large" device. Accordingly, each modular nuclear fission waste conversion reactor core has three characteristic dimensions, each of which is typically not substantially less than one mean free path for fission-inducing neutrons.

Each nuclear fission waste conversion reactor module comprises a reactor core housing that includes a reactor pressure vessel (5a) and other structural components. Portions of the reactor core housing that are not proximate to the core itself may be made from any materials acceptable for use in reactor pressure vessels, such as without limitation stainless steel. Within the reactor core housing, neutron reflectors (8, 9, 18, 19) and a radiation shield (21) generally surround the reactor core. In some embodiments, the reactor pressure vessel may be sited underground; in such instance, the reactor core housing may exist in a caisson that can also function as a pressure retention vessel in case of a primary coolant system leak. Right circular cylindrical control drums (5d), located in recesses in the inner reflector (18), may be used in reactor control; other known control arrangements, e.g. linear control rods, might alternatively be used. Twelve such rotatable drums (5d) are depicted in FIG. 3, but other numbers of drums may be used. A control drum may be made, for example, of two semi-cylindrical halves split between BeO and graphite, with the BeO normally facing the core. A layer or strip of neutron poison would be attached to the graphite half surface that is normally located away from the core. Control would be accomplished by rotating the drums to move the poison layers closer to the core. Various control poisons might be used including $B_4C$, $Gd_2O_3$, $Eu_2O_3$, $Er_2O_3$ and $HfO_2$. The core will have a relatively large neutron leakage, and the control drums (5d) will have some negative reactivity effect even when the poison layer is rotated away from the core. Fully enriched $B_4C$ is preferred, and a 180° layer of $B_4C$ about 1 cm thick may be used to coat ½ the surface of a drum of about 30 cm. diameter.

The reactor core contains coolant channels which are preferably aligned substantially vertically to help reduce resistance to reactor fluid flow therewithin. The use of the substantially vertical coolant channels may also help mitigate reductions in thermal driving head in natural circulation applications. The coolant channels are operatively coupled in fluid communication with the lower inlet plenum (7) and the upper outlet plenum (10) in the reactor core housing. At least a portion of the reactor coolant system, such as cold leg piping (6) of the cross-duct (5) of the reactor coolant system, is coupled to the inlet plenum. A portion of the reactor coolant system, such as hot leg piping (11) of the reactor coolant system, is coupled to the outlet plenum.

When the reactor coolant is helium (He) gas, the cold leg piping may be made from nuclear grade steel. The hot leg piping (11) may be made from high temperature steels, refractory metals, or advanced ceramic composites. As seen in FIG. 1, the hot leg plenum is linked to an outlet path to an inlet of a heat exchanger or a converter (4), such as a steam generator, or to multiple thereof. The cold leg plenum (6) is coupled to receive cooled fluid from an outlet port of each of the heat converters and return it to the core.

Heat converters (4) may be fluid-driven electrical turbine generators, such as a gas-driven electrical turbine generator, or may be a combination of a steam generator and a steam-driven electrical turbine generator. Other heat exchangers may also be used. The heat converters are not intended to be limited and can include any kind of heat converter desired for a particular application. It will further be appreciated that any number of the heat converters may be used as desired for a particular application. To that end, the number of heat converters does not need to be the same as the number of modular nuclear fission waste conversion reactor modules when a multiple arrangement is used.

In some embodiments, the reactor coolant system may provide for a natural circulation of reactor coolant, even if its only purpose is for core heat removal when forced circulation is not being used. In such applications, the heat converters are physically located above the modular nuclear fission waste conversion reactors with a vertical separation sufficient to generate a thermal driving head as desired for a particular application. In other embodiments, the reactor coolant system may be a forced circulation system wherein suitable reactor coolant circulators or other similar devices are included within the reactor coolant piping system as desired.

Illustrative Methods Associated with Modular Nuclear Fission Waste Conversion Reactors Flowchart FIG. 12 depicts an implementation of certain processes and operations. Those having skill in this art will appreciate that the style of presentation utilized herein (e.g. beginning with a presentation of a flowchart presenting an overall view and thereafter providing additions to and/or further details in subsequent flowcharts) generally allows for a rapid and easy understanding of the various process implementations.

Referring now to FIG. 12, nuclear heavy metal, such as Th, U, higher actinides, and/or transuranics, is required for both the initial fissile and the conversion sections. For the first generation modular nuclear fission waste conversion reactor, the initial fissile fuel heavy metal may be LEU. This fuel is chemically converted to carbide, sintered and fabricated into clad fissile fuel elements (12).

The first generation modular nuclear fission waste conversion reactor core includes fertile material, e.g. DU, and when spent nuclear fuel is used, an additional step to remove the existing cladding and to prepare the fuel for subsequent processing is needed. This step may release volatile fission products, but it would not generally separate different heavy metals nor substantially remove solid fission products. However, some fission products might be separated if desired. This fertile fuel is also converted to carbide, sintered and fabricated into clad fertile fuel elements.

The first generation modular nuclear fission waste conversion reactor fuel/clad/structure is inserted in the first generation modular nuclear fission waste conversion reactor as part of its construction as depicted in FIG. 12. The operation of first generation modular nuclear fission waste conversion reactor produces energy, and at least frequently, and preferably continuously, volatile fission products are removed from the core.

After an operational life of likely two or more decades, the fuel with its cladding and fuel element structure is removed from the first generation modular nuclear fission waste conversion reactor. A waiting period for fission product decay may be utilized to reduce radiation levels during subsequent steps. The structure and cladding are removed from the fuel elements and discarded, so that the remaining material consists of heavy metals (fertile and fissile) and solid fission products. This material is processed to remove a significant fraction of the solid fission products but such processing would not usually effect elemental separation of heavy metals nor change the enrichment of the removed spent fuel material.

FIG. 12 illustrates how the heavy metal/partial solid fission product material becomes the next generation's modular nuclear fission waste conversion reactor initial fissile core material. The amount of fertile material employed in first and second generation modular reactor cores may be slightly different; however, after several generations, the process reaches steady state so that the material volume and composition do not significantly change between generations of reactor cores. After the operative life of the first generation core of such a modular reactor system, some fresh fertile material (generally nuclear waste, such as DU or spent nuclear fuel) is supplied for a subsequent core, while volatile fission products that were removed during operational lifetime and fission products separated from the spent core fuel elements are eliminated.

Reactor Core Illustrative Embodiment

One embodiment of a reactor core physical arrangement that might be used is depicted in the various drawings. The reactor core would include fuel assemblies, reflector elements, a neutron shield, startup neutron sources, and reactivity control components, all located within the core barrel (21a) and supported by the core support structure (5c). The active core may be provided by an assemblage of rectangular, ceramic, fuel element holders (13a), each of which contains full length channels or grooves in its interior vertical wall surfaces into which flat fuel elements (12) are slidably installed, spaced uniformly from one another to provide vertical channels for helium coolant flow. The embodiment of the active core that is illustrated contains 21 juxtaposed fuel columns (see FIGS. 3 and 9 which show cross-sectional drawings of the reactor core at about the active core mid-plane with the depiction of a fissile section of the stratified core).

An exemplary core using such flat fuel elements may include 17 horizontal regions in the form of stacked layers or arrays; each array in the illustrated embodiment includes 21 fuel element assemblies (13) wherein 48 flat, vertically aligned fuel elements (12) are disposed as 2 rows in surrounding, rectangular, open boxes or holders (13a) as seen in FIG. 6. The construction is the same for assemblies (13) of both fissile fuel elements and fertile fuel elements; moreover, a similar construction is conveniently used to provide the upper and lower reflectors. Individual fuel elements (12) are slidably received in channels or grooves cut in the sidewall's central divider of the structural material that makes up the holder (13a), which is preferably silicon carbide composite material. As mentioned before, the installed fuel elements (12) can be suitably secured or attached to the surrounding frame as by using a thin layer of green SiC paste and heating to bond the fuel element cladding to the surfaces of the grooves in the surrounding holders. A typical fuel element assembly (13) might be about 43 centimeters square and have a height of about 16 cm. The illustrated holder 13a, which is open top and bottom, is designed to contain 48 fuel elements which are supported as two groups of 24, with the fuel elements spaced about 3 mm apart to provide the coolant flow channels.

Thus, in this one embodiment of an exemplary core, there will be 21 fuel element assemblies (13) of square cross section in each of the 17 horizontal layers to provide an active core region having a height of about 2.72 meters. This core embodiment might contain, in vertical sequence, 4 layers that provide the upper conversion section, 3 layers that provide the upper initial fissile section, 3 layers that provide the central conversion section, 3 layers that provide the lower initial fissile section, and 4 layers that provide the lower conversion section. The six layers that constitute the upper and lower initial fissile section horizontal regions would each include an annular pattern or area of fissile fuel elements in the form of 8 square boxes filled entirely with fissile fuel elements surrounding one center box which contains only fertile fuel elements. The 12 remaining boxes, located around the periphery of the 9 box square region in the center of the 21 column core arrangement, as indicated by bold lines in FIGS. 3 and 9, each comprise one-half fissile fuel elements and one-half fertile fuel elements, with the fertile fuel elements being positioned in the radially outer half of each box. Accordingly, the fissile fuel area of each of the six horizontal arrays that constitute the two initial fissile fuel sections (22) would each include a pattern of 672 fissile fuel elements located within the annular area bounded by the heavy dark outline in FIG. 3. This depicts the generally annular pattern within the array surrounding one center holder that contains 48 fertile fuel elements. The 12 radially outermost fuel assemblies would contain 288 fertile fuel elements in the radially outer halves, for a total of 336 fertile fuel elements in each of these horizontal arrays. The 11 layers that comprise the conversion sections (23) would each contain 21 assemblies of entirely fertile fuel elements, i.e. 1008 fuel elements in each array. As best seen in FIG. 9 the orientations of the boxes are alternated so that the flat fuel elements (12) in each box in one layer are aligned at 90° to the fuel elements (12) in any box directly alongside in any of the four directions.

Located vertically below and above the active core region are reflector regions, which are shown schematically in FIG. 2 and marked with reference numerals (8) and (9). These two upper and lower reflector regions are conveniently made of arrays of flat plates of graphite material of similar shape as the fertile and fissile fuel elements and disposed in similar ceramic holders. This arrangement creates continuous vertical channels for upward helium coolant flow through the lower reflector (8), the active core (2) and the upper reflector (9). The alternating arrangement of the orientation of the flat fuel elements in adjacent columns guards against potential streaming that might result in uneven coolant distribution across the core.

It will be appreciated that arrangement and geometry of embodiments of modular nuclear fission waste conversion reactors disclosed herein, their cores and their components are not intended to be limited to any geometry and/or arrangement whatsoever. Described components (e.g. blocks), devices, and objects and the discussion accompanying them are used as examples for the sake of conceptual clarity, and various configuration modifications are acceptable. Consequently, as used herein, the specific exemplars set forth and the accompanying discussion are intended to be representative of their more general classes. In general, use of any specific exemplar herein is also intended to be representative of its class, and the non-inclusion of such specific components (e.g. blocks), devices, and objects herein should not be taken as indicating that limitation is desired.

As previously indicated, the fuel elements which include the sintered carbide fuel bodies can take various shapes. Instead of the flat plate shape illustrated in FIGS. 5 and 6, the fuel elements might take the form of elongated fuel rods (51) as shown in FIG. 16A. Such fuel rod elements might comprise a tubular silicon carbide material container (53) having a flat cover (55) that carries a vent (57) located in the center of such cover. Such vent could be located at either the top or the bottom of the fuel rod element. Such an elongated cylindrical tube (53) would hold a column of individual sintered fuel compacts, which might be short cylinders of sintered carbide fuel a few centimeters in diameter and a few centimeters high. Each of the fuel bodies (59) might be coated on its lateral surface with a smooth layer (61) of uranium monocarbide or the like to assure good heat transfer from the fuel material to the sidewall of the encompassing silicon carbide container (53). Because the elongated tubes (53) that would serve as the containers for the fuel bodies (59) in such a rod-type fuel element (51) would be fabricated independently, the fuel would not be potentially exposed to vapor deposition of beta silicon carbide from a vapor atmosphere, and thus the sintered fuel would not likely require a pyrolytic carbon seal layer.

It is contemplated that these fuel rod elements (51) might extend for the entire height of the reactor core. In which case, each tubular container (53) would contain appropriate sintered compacts of fissile and/or fertile carbide nuclides. For example, the rod-like fuel elements (51) located in the vertical columns of the reactor core that pass through the annular patterned area of the two spaced-apart initial fissile sections (22) might include a lower region made up of bodies of fertile nuclides. Disposed thereabove would be the lower intermediate region containing fissile nuclides which would contribute to the lower initial fissile section of the core. A central region of fertile nuclide bodies would be disposed thereabove and surmounted by the upper intermediate region bodies containing fissile nuclides that would contribute to the upper initial fissile section (22). A region of fertile fuel bodies would then extend above it, for example to the cover (55) if the vent (57) is located at the top. All of the cylindrical fuel body compacts would be provided with a packing density as earlier described; optionally, a central hole (62) might be provided in the fuel bodies (59) so as to assure a pathway for volatile fission products through the entire length of elongated fuel element (51) to the vent (57) at its top or bottom.

For handling purposes, these fuel rod elements (51) would be likely disposed within surrounding thin boxes (63) of silicon carbide or the like. Illustrated in FIG. 16C is such an elongated box in the form of a hexagonal tube (63). A plurality of such hexagonal tubes (63) would be conveniently fit together, with their sidewalls juxtaposed with one another, to form the vertical reactor core (2). Alternatively, square boxes or boxes of other uniform shape might also be used. The fuel rod elements (51) would be close-packed within such a surrounding box or frame (63) as shown in FIGS. 16C and 16D. For example, an open mesh (65) might be affixed to the top surface and to the bottom surface of the hexagonal box (63) so as to assist in the regular spacing of the rod fuel rod elements (51) so there would be coolant channels surrounding the entire surface of each of the elements to assure uniform heat transfer therefrom. A header system (not shown) would similarly be used to interconnect the vents (57) of what might, for example, be 91 individual fuel rod elements (51) disposed within a hexagonal box (63). Such headers from the top or bottom of each hexagonal box would be connected to piping as described hereinbefore that would lead to the fission product separation facility. Conceivably the fuel elements (51) could be even further elongated to include upper and lower reactor sections. However, inasmuch as the reflector material would not be generating fission products, it might be expedient to provide similar boxes of rods of reflector material that could be positioned above and below the reactor core region which would simply continue the fuel and coolant channel geometric patterns through these regions.

While various aspects and embodiments have been disclosed herein which constitute the best mode presently known to the inventors, other aspects and embodiments will be apparent to those skilled in the art, and changes can be made without departing from the invention the scope of which is defined in the appended claims. Particular features are emphasized in the following claims.

The invention claimed is:

1. A small nuclear fission reactor designed to operate for a decade or longer without refueling, which reactor comprises:
   a reactor vessel,
   a central core within said vessel for creating heat via fission reactions in said core, which core includes a plurality of initial fissile sections located in a plurality of vertically spaced apart horizontal regions, and flanking conversion sections, said a plurality of initial fissile sections remaining an active, integral part of a critical core region throughout the lifetime of the central core,
   a helium circulation system for extracting heat from said core by the circulation of helium into and out of said vessel to maintain the core temperature between about 700° C. and 1000° C. and to generate power from said heated helium exterior of said vessel,
   said a plurality of initial fissile sections of said core comprising fuel elements in the form of silicon carbide containers which contain sintered fuel bodies comprising carbide fissile and fertile nuclides, the silicon carbide containers having a thickness of at least about 1 mm, and
   a system for continuously withdrawing volatile fission products from said fuel elements during normal operation, the fission products being removed in a flow path separate from the helium circulation system.

2. The reactor of claim 1 wherein said a plurality of initial fissile sections comprise two spaced apart horizontal regions with each comprising a generally annular area of said fissile fuel bodies and wherein said flanking conversion sections comprise horizontal regions of fertile fuel bodies located above, between and below said two horizontal regions containing said fissile fuel bodies.

3. The reactor of claim 2 wherein said core further comprises fertile fuel bodies located in the center of and about the periphery of both of said generally annular areas of said fissile fuel bodies in their respective horizontal regions that comprise said a plurality of initial fissile sections.

4. The reactor of claim 3 wherein said horizontal regions which comprise said a plurality of initial fissile sections and said flanking conversion sections each comprise a plurality of fuel element assemblies, each assembly comprising a holder with multiple fuel elements arranged therewithin, which fuel elements contain said sintered fuel bodies and are aligned within said core to facilitate helium coolant flow vertically through said assemblies in passageways adjacent each said fuel element.

5. The reactor of claim 4 wherein said assemblies of vertically aligned fuel elements in said conversion sections and in said initial fissile section are arranged to create a plurality of juxtaposed vertical columns extending through said central core.

6. The reactor of claim 4 wherein a plurality of said fuel elements within each said holder are manifolded to a common connector to facilitate the withdrawal of volatile fission products as a composite stream from said fuel elements therewithin.

7. The reactor of claim 6 wherein said assemblies each comprise at least one of a plurality of fissile and fertile fuel elements in the form of containers formed of silicon carbide cladding that each enclose an interior fuel region in the form of a flat plate comprising at least one of sintered carbide fissile and fertile nuclides.

8. The reactor of claim 7 wherein said central core is surrounded by a plurality of blocks of BeO or $Be_2C$ reflector material to provide a surrounding reflector region that has a right circular cylindrical exterior surface.

9. The reactor of claim 8 wherein core reactivity control mechanisms in the form of vertically aligned, right circular cylindrical control drums are disposed in recesses in said reflector region to control the neutron population within said core.

10. The reactor of claim 8 wherein said reflector region is surrounded by an annular graphite outer reflector, which is in turn surrounded by an annular neutron shield containing a neutron capture material that is located in juxtaposition with a tubular core barrel that is spaced from an interior surface of said reactor vessel to provide coolant flow passageways therebetween.

11. The reactor of claim 1 wherein said sintered carbide fuel in said fuel elements occupies the interior of each said container to a packing density of about 50 to 80 volume percent in order to provide space for the accumulation of nonvolatile fission products therewithin and assure sufficient interconnected porosity for volatile fission product migration and exit therefrom.

12. The reactor of claim 11 wherein said fuel elements contain sintered near-monocarbides which comprise at least about 5% excess carbon in the immediate fuel body region to provide carbon for potential chemical reaction with fission products.

13. The reactor of claim 12 wherein said initial fissile section fuel bodies comprises $UC_{1.05}$-$UC_{1.3}$ with an enrichment of between about 4% and 18%.

14. A small nuclear fission waste conversion reactor designed to operate for a decade or longer without refueling, which reactor comprises:

a reactor vessel, a central core within said vessel for creating heat via fission reactions in said core, which core includes one or more initial fissile sections and flanking conversion sections, which one or more initial fissile sections remain a part of the critical central core throughout reactor lifetime, a helium circulation system for extracting heat from said core by the circulation of helium into and out of said vessel to maintain the core temperature between about 700° C. and 1000° C. and to generate power from said heated helium at a location exterior of said vessel, said core including a plurality of fuel elements in the form of silicon carbide containers that enclose sintered bodies of at least one of carbide fissile and fertile nuclides, the silicon carbide containers having a thickness of at least about 1 mm, the sintered bodies each include a central hole, and a system for withdrawing volatile fission products from said plurality of fuel elements during normal operation the fission products being removed in a flow path separate from the helium circulation system via the central hole in the sintered bodies.

15. The reactor of claim 14 wherein said core further comprises additional sintered fertile fuel bodies in two initial fissile horizontal regions, which additional fertile bodies are located centrally within and about the periphery of an annular area of each fissile fuel element.

16. The reactor of claim 14 wherein the materials present within the core are selected so that a majority of the fission reactions within the core occur using neutrons that have not yet slowed to thermal energy levels.

17. The reactor of claim 14 wherein the amounts of fertile and fissile fuel in said sintered bodies within said initial core are such that, after 10 years of essentially continuous operation, the major portion of the energy being produced in the reactor results from fissioning of nuclides that were present in the initial reactor core as fertile nuclides and were subsequently converted into fissile nuclides.

18. The reactor of claim 14 wherein silicon carbide fuel element containers enclose the fissile and fertile fuel in said central core, which containers have the ability to anneal radiation-induced displacements within the temperature range of 700°-1000° C. so as to allow the central core to operate at high total fluence levels.

19. The reactor of claim 18 wherein said fuel element containers comprise woven silicon carbide material impregnated with vapor-deposited n-SiC.

* * * * *

UNITED STATES PATENT AND TRADEMARK OFFICE
CERTIFICATE OF CORRECTION

PATENT NO. : 9,767,926 B2  
APPLICATION NO. : 13/566078  
DATED : September 19, 2017  
INVENTOR(S) : Schleicher et al.

Page 1 of 1

It is certified that error appears in the above-identified patent and that said Letters Patent is hereby corrected as shown below:

In the Claims

Claim 19, Column 20, Line 62, delete "n-SIC." and insert --β-SIC.--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*